United States Patent
Irani et al.

(10) Patent No.: US 9,692,939 B2
(45) Date of Patent: Jun. 27, 2017

(54) DEVICE, SYSTEM, AND METHOD OF BLIND DEBLURRING AND BLIND SUPER-RESOLUTION UTILIZING INTERNAL PATCH RECURRENCE

(71) Applicant: Yeda Research & Development Co. Ltd., Rehovot (IL)

(72) Inventors: Michal Irani, Rehovot (IL); Tomer Michaeli, Zichron Ya'akov (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 347 days.

(21) Appl. No.: 14/289,670

(22) Filed: May 29, 2014

(65) Prior Publication Data

US 2014/0354886 A1    Dec. 4, 2014

Related U.S. Application Data

(60) Provisional application No. 61/828,204, filed on May 29, 2013.

(51) Int. Cl.
G06K 9/00 (2006.01)
H04N 1/409 (2006.01)
G06T 5/00 (2006.01)

(52) U.S. Cl.
CPC ........ H04N 1/4092 (2013.01); G06T 5/003 (2013.01); G06T 2207/20016 (2013.01); G06T 2207/20192 (2013.01)

(58) Field of Classification Search
None
See application file for complete search history.

(56) References Cited

U.S. PATENT DOCUMENTS

2012/0086850 A1    4/2012  Irani et al.
2012/0121202 A1*   5/2012  Wang .................... G06T 5/003
                                                       382/255

(Continued)

OTHER PUBLICATIONS

I. Begin and F.R. Ferrie. "Blind super-resolution using a learning-based approach". In International Conference on Pattern Recognition (ICPR), vol. 2, pp. 85-89, 2004.

(Continued)

*Primary Examiner* — Weiwen Yang
(74) *Attorney, Agent, or Firm* — Mark S. Cohen; Pearl Cohen Zedek Latzer Baratz LLP

(57) ABSTRACT

Devices, systems, and methods of blind deblurring and blind super-resolution utilizing internal patch recurrence. Small signal patches tend to repeat "as is" across multiple scales of a natural signal. This fractal-like behavior is utilized for signal processing tasks, including "Blind Deblurring" or "Blind Super-Resolution", namely, removing signal blur or increasing signal resolution without a-priori knowledge of the underlying blur kernel. While the cross-scale patch recurrence is strong in signals taken under ideal conditions, the cross-scale patch recurrence significantly diminishes when the acquisition blur deviates from an ideal blur. These deviations from ideal patch recurrences are used for recovering the underlying (unknown) blur kernel. The correct blur kernel is recovered by seeking the kernel which maximizes the patch similarity across scales of a related "reference" signal. For example, this reference signal may be the low-resolution input signal, the sharp deblurred-version of a blurry input signal, or the like. Quantitative and qualitative experiments indicate that this approach yields improved or superior results, in "Blind Deblurring" and in "Blind Super-Resolution".

26 Claims, 11 Drawing Sheets

(56) References Cited

U.S. PATENT DOCUMENTS

2012/0281923 A1   11/2012   Irani et al.
2013/0163882 A1*   6/2013   Smith ................... G06T 5/003
                                                                                 382/199

OTHER PUBLICATIONS

H. Chang, D.-Y. Yeung and Y. Xiong. "Super-resolution through neighbor embedding". In IEEE Conference on Computer Vision and Pattern Recognition (CVPR), vol. 1, pp. 275-282, vol. 1, 2004.

Y. C. Eldar and T. G. Dvorkind. "A minimum squared-error framework for generalized sampling". IEEE Trans. Signal Process., 54(6):2155-2167, 2006.

Y. C. Eldar and T. G. Dvorkind. "Beyond bandlimited sampling". IEEE Signal Process. Mag., 26(3): 48-68, May 2009.

R. Fattal. "Image upsampling via imposed edge statistics". ACM Transactions on Graphics (TOG), 26(3): 95, 2007.

G. Freedman and R. Fattal. "Image and video upscaling from local self-examples". ACM Transactions on Graphics (TOG), 30(2):12, 2011.

W. T Freeman, T. R. Jones, and E. C. Pasztor. "Example-based super resolution". IEEE Computer Graphics and Applications, 22(2):56-65, 2002.

D. Glasner, S. Bagon, and M. Irani. "Super-resolution from a single image". In International Conference on Computer Vision, 2009.

Y. He, K.-H. Yap, L. Chen, and L.-P. Chau. "A soft map framework for blind super-resolution image reconstruction". Image and Vision Computing, 27(4): 364-373, 2009.

M. Irani and S. Peleg. "Improving resolution by image registration". CVGIP: Graphical Models and Image Processing. 53(3): 231-239, 1991.

N. Joshi, R. Szeliski, and D. J. Kriegman. "PSF estimation using sharp edge prediction". In IEEE Conference on Computer Vision and Pattern Recognition (CVPR), pp. 1-8, 2008.

A. Levin, Y. Weiss, F. Durand, and W. T. Freeman. "Understanding and evaluation blind deconvolution algorithms". In IEEE Conference on Computer Vision and Pattern Recognition (CVPR), pp. 1964-1971, 2009.

A. Levin, Y. Weiss, F. Durand, and W. T. Freeman. "Efficient marginal likelihood optimization in blind deconvolution". In IEEE Conference on Computer Vision and Pattern Recognition (CVPR), pp. 2657-2664. IEEE 2011.

S. Mallat and G. Yu. "Super-resolution with sparse mixing estimators". IEEE Trans. Signal Process., 19(11):2889-2900, 2010.

J. Qiao, J. Liu, and C. Zhao. "A novel SVM-based blind super-resolution algorithm". In International Joint Conference on Neural Networks, pp. 2523-2528, 2006.

M. Unser. "Sampling—50 years after Shannon". IEEE Proc., 88:569-587, Apr. 2000.

M. Unser and A. Aldroubi. "A general sampling theory for nonideal acquisition devices". IEEE Trans. Signal Process., 42(11):2915-2925, 1994.

Q. Wang, X. Tang, and H. Shum. "Patch based blind image super resolution". In IEEE International Conference on Computer Vision (ICCV), vol. 1, pp. 709-716, 2005.

J. Yang, J. Wright, T. Huang, and Y. Ma. "Image super-resolution as sparse representation of raw image patches". In IEEE Conference on Computer Vision and Pattern Recognition (CVPR), pp. 1-8, 2008.

R. Zeyde, M. Elad, and M. Protter. "On single image scale-up using sparse-representations". Curves and Surfaces, pp. 711-730, 2012.

X. Zhang and Z. Wu. "Image interpolation by adaptive 2D autoregressive modeling and soft-decision estimation". IEEE Trans. Image Process., 17(6):887-896, 2008.

M. Zontak and M. Irani. "Internal statistics of a single natural image". In IEEE Conference on Computer Vision and Pattern Recognition (CVPR), pp. 977-984, 2011.

S. Cho and S. Lee. "Fast Motion Deblurring". In: ACM Transactions on Graphics (TOG). vol. 28. (2009) 145.

T. Cho, S. Paris, B. Horn, and W. T. Freeman. "Blur Kernel Estimation using the Radon Transform". In: IEEE Conference on Computer Vision and Pattern Recognition (CVPR) (2011) 241-248.

R. Fergus, B. Singh, A. Hertzmann, S. T. Roweis, and W. T. Freeman. "Removing Camera Shake from a Single Photograph". In: ACM Transactions on Graphics (TOG). vol. 25. (2006) 787-794.

A. Goldstein and R. Fattal. "Blur-Kernel Estimation from Spectral Irregularities". In: Computer Vision—ECCV 2012. Springer (2012) 622-635.

D. Krishnan, T. Day and R. Fergus. "Blind Deconvolution Using a Normalized Sparsity Measure". In: IEEE Conference on Computer Vision and Pattern Recognition (CVPR). (2011) 233-240.

A. Levin, R. Fergus, F. Durand, and W. T. Freeman. "Image and Depth from a Conventional Camera with a Coded Aperture". ACM Transactions on Graphics (TOG) 26(3) (2007) 70.

T. Michaeli and M. Irani. "Nonparametric Blind Super-Resolution". In: IEEE International Conference on Computer Vision (ICCV) (Dec. 2013).

Q. Shan, J. Jia, and A. Agarwala. "High-quality Motion Deblurring from a Single Image". In: ACM Transactions on Graphics (TOG), vol. 27 (2008) 73.

L. Sun, S. Cho, J. Wang, and J. Hays. "Edge-based Blur Kernel Estimation Using Patch Priors". In: IEEE International Conference on Computational Photography (ICCP). (2013) 1-8.

L. Xiu and J. Jia. "Two-Phase Kernel Estimation for Robust Motion Deblurring". In: Computer Vision—ECCV. Springer (2010) 157-170.

M. Zontak, I. Mosseri, and M. Irani. "Separating Signal from Noise using Patch Recurrence Across Scales". In: IEEE Conference on Computer Vision and Pattern Recognition (CVPR) (2013) 1195-1202.

D. Zoran and Y. Weiss. "From Learning Models of Natural Image Patches to Whole Image Restoration". In: IEEE International Conference on Computer Vision (ICCV). (2011) 479-486.

S. Harmeling, S. Sra, M. Hirsch, and B. Scholkopf. "Multiframe blind deconvolution, super-resolution, and saturation correction via incremental EM". In ICIP, 2010.

F. Sroubek, G. Cristobal, and J. Flusser. "Simultaneous superresolution and blind deconvolution". In Journal of Physics: Conference Series, vol. 124, 2008.

Peyman Milanfar, editor; "Super-Resolution Imaging" (ISBN 9781439819302); chapter 1, pp. 3-35, by Jianchao Yang and Thomas Huang, "Image super-resolution: Historical overview and future challenges"; CRC press, 2010.

* cited by examiner

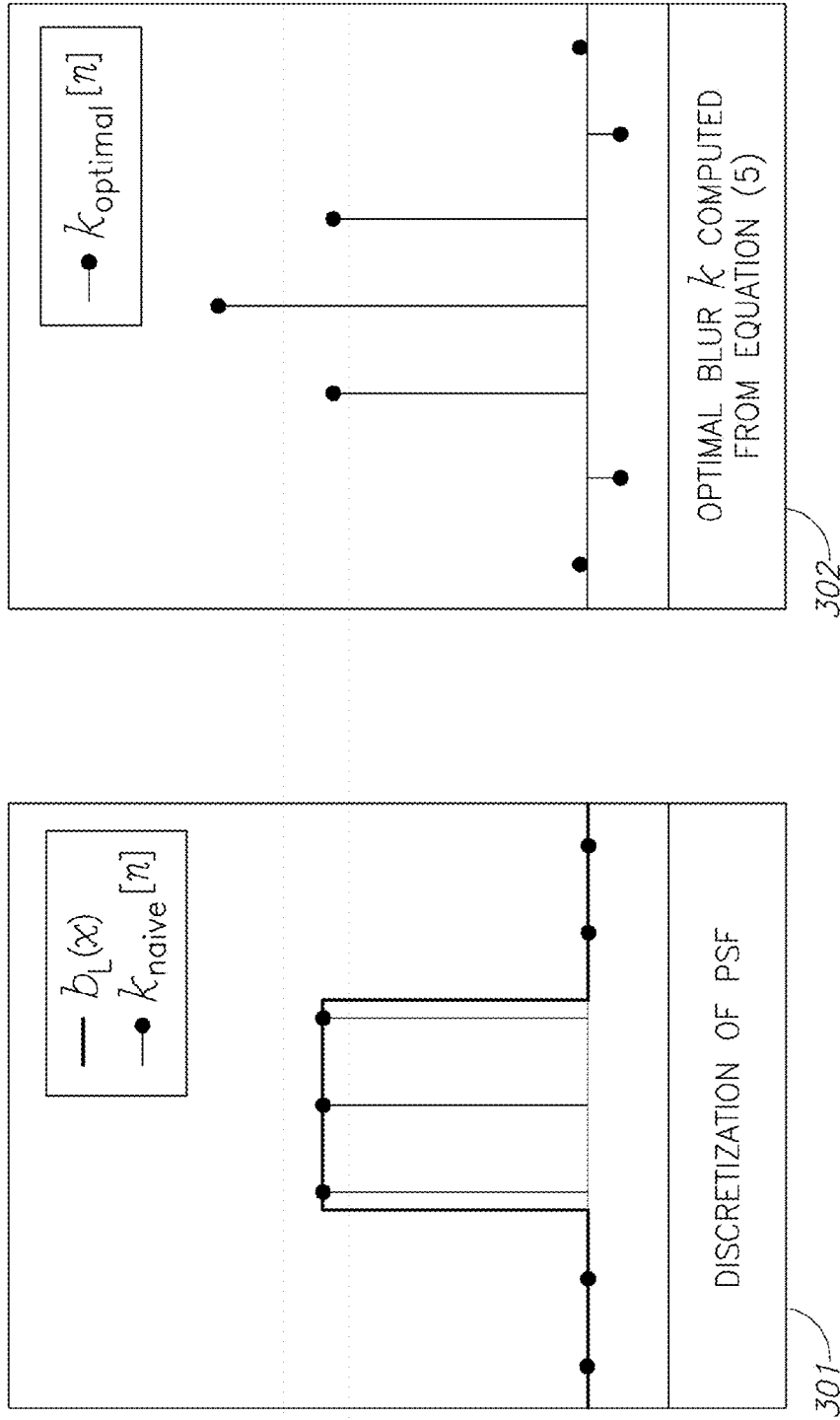

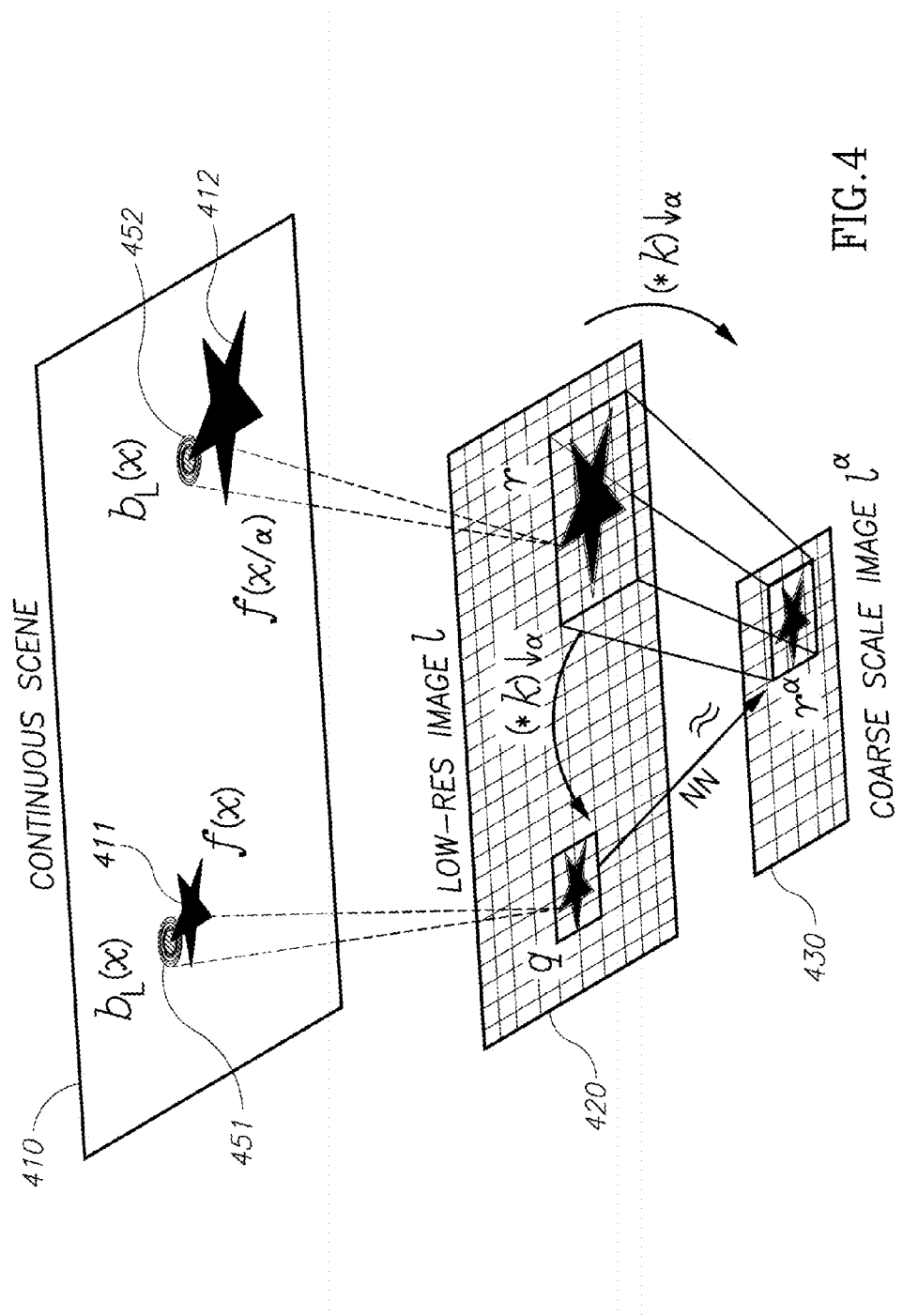

DEVICE, SYSTEM, AND METHOD OF BLIND DEBLURRING AND BLIND SUPER-RESOLUTION UTILIZING INTERNAL PATCH RECURRENCE

CROSS-REFERENCE TO RELATED APPLICATIONS

This application claims priority and benefit from U.S. provisional patent application 61/828,204, entitled "Non-parametric Blind Super-Resolution", filed on May 29, 2013, which is hereby incorporated by reference in its entirety

FIELD

The present invention relates to the field of image processing.

BACKGROUND

Super Resolution (SR) may refer to a method or algorithm for recovering a high-resolution image from one or several low-resolution versions of that image. Most SR methods operate under the assumption that the low-resolution input image was obtained by down-sampling the unknown high-resolution image with a known blur kernel. The blur kernel is typically assumed to be the Point Spread Function (PSF) of the camera; or, when the PSF value is unknown, the blur kernel is assumed to be a standard Low-Pass Filter (LPF) such as a Gaussian kernel or a bicubic kernel. Unfortunately, many SR algorithms fail to yield adequate results.

Photos often come out blurry due to camera shake, defocus or low-grade optics. Undoing this undesired effect is called de-blurring or deblurring, and most deblurring methods rely heavily on the availability of prior knowledge on the desired sharp image. Most existing algorithms rely, either explicitly or implicitly, on the fact that images contain enough step edges. This assumption is formulated in various ways. Some studies assume simple parametric probability models, which promote sparsity of image gradients. Other studies assume a parametric form for the spectrum of the image, which decays polynomially with frequency (corresponding to the Fourier transform of step edges). Many approaches employ heuristic methods for detecting and/or enhancing edges in the blurry image. These range from setting a threshold on the image gradients, to shock and bilateral filtering. Unfortunately, many de-blurring algorithms fail to yield adequate results.

SUMMARY

The present invention may include, for example, devices, systems, and methods of blind deblurring and blind super-resolution utilizing internal patch recurrence.

In accordance with the present invention, small image patches tend to repeat "as is" across multiple scales of a natural image. This fractal-like behavior may be utilized for various image processing tasks, including "Blind Deblurring" or "Blind Super-Resolution", namely, removing image blur or increasing image resolution without a-priori knowledge of the underlying blur kernel. While the cross-scale patch recurrence may be strong in images taken under ideal imaging conditions, the cross-scale patch recurrence significantly diminishes when the camera blur deviates from an ideal blur. These deviations from ideal patch recurrences may be used for recovering the underlying unknown blur kernel. For example, the correct blur kernel may be recovered by seeking the kernel which maximizes the patch similarity across scales of the input image. Quantitative and qualitative experiments indicate that the methods of the present invention may yield improved or superior results, both in "Blind Deblurring" and in "Blind Super-Resolution".

In accordance with the present invention, for example, a method for performing a signal-processing task on an input signal may comprise: estimating a blur kernel associated with said input signal, by utilizing recurrence of signal patches across multiple scales inside a reference signal which is a related version of said input signal; wherein the method is implemented by using a device comprising at least a hardware component.

In some embodiments, a device for performing a signal-processing task on an input signal may comprise: a blur kernel estimator to estimate a blur kernel associated with said input signal, by utilizing recurrence of signal patches across multiple scales inside a reference signal which is a related version of said input signal.

In some embodiments, the device may comprise: a Super Resolution module to perform Blind Super-Resolution of a low-resolution signal, by utilizing patch recurrence across scales of said low-resolution signal to recover a super-resolution blur kernel, and by utilizing said super-resolution blur kernel for generating a high-resolution signal.

In some embodiments, the device may comprise: a deblur module to perform Blind Deblurring of said input signal, by estimating a blur kernel and a sharp version of said input signal, wherein said sharp version of said input signal is related to said input signal by said blur kernel, and wherein patch similarity is maximized across scales of said sharp version of said input signal.

The present invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIGS. 3A and 3B are schematic illustrations of two graph charts, one graph chart (FIG. 3A) demonstrating a simple discretization of the PSF, and another graph chart (FIG. 3B) demonstrating the optimal SR blur kernel for such a PSF, in accordance with the present invention;

FIG. 4 is a schematic illustration demonstrating utilization of patch-recurrence across scales for recovering the optimal SR blur kernel, in accordance with the present invention;

DETAILED DESCRIPTION OF SOME EMBODIMENTS

Figure 1A:
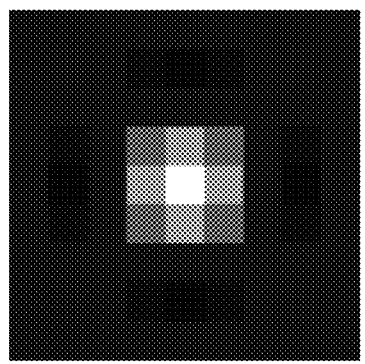
FIG. 1A is a schematic illustration of a default prior-art blur kernel that was used in conventional SR algorithms that yielded low-quality SR results.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that Super Resolution (SR) algorithms typically utilize a blur kernel while assuming that the blur kernel is known (e.g., the Point Spread Function (PSF) of the camera, or a default low-pass filter, for example, Gaussian filter). However, the performance of SR methods significantly deteriorates when the assumed blur kernel deviates from the true blur kernel. The present invention comprises a framework for "blind" super resolution, which may not rely on such assumption. Applicants have realized that unlike the common belief, the PSF of the camera is a wrong blur kernel to use in SR algorithms. The methods and systems of the present invention may recover the correct SR blur kernel directly from a low-resolution image. This may be achieved by utilizing the inherent recurrence property of small natural image patches, internally within the same image and/or externally in a collection of other natural images). In accordance with the present invention, recurrence of small image patches across scales of the low-resolution image (which forms the basis for single-image SR), may further be used for estimating the optimal blur kernel. This may yield significant improvement in SR results, as well as in results of other image-processing algorithms (e.g., deblurring or anti-blurring, or other image-processing algorithms which aim to sharpen an image or a blurry image), which may utilize an optimal blur kernel calculated or estimated in accordance with the present invention. It is clarified that each image, which is intended to be processed or intended to be a subject for SR or deblurring or other image processing or image enhancement tasks, typically has its own, particular, optimal blur kernel; and that a general blur kernel may not be used, typically, for enhancing a batch of different images.

Applicants have realized that the PSF may vary in practice with zoom, focus, and/or camera shake; and that relying on the wrong blur kernel may lead to low-quality SR results. Applicants have further realized that unlike the common belief, even if the PSF is known, the PSF is the wrong blur kernel to use in SR algorithms. The present invention comprises methods for obtaining the optimal blur kernel directly from the low-resolution image, thereby enabling SR algorithms (or other suitable algorithms that rely on the blur kernel) to utilize the correct or optimal blur kernel.

Applicants have realized that a very limited amount of work has been dedicated to "blind SR", namely SR in which the blur kernel is not assumed known; and that prior attempts in this field have not yielded quality results. Methods in this category assume some parametric model for the kernel (e.g., still a Gaussian kernel, but with unknown width) and infer its parameters. A nonparametric or "blind" kernel recovery method has been attempted for SR and for deblurring, but assumed that the blur kernel has a single peak, which the Applicants realized is a restrictive assumption in the presence of motion blur. Similarly, methods for jointly estimating the high-resolution image and a nonparametric blur kernel may lead to erroneous results, according to previous studies.

The present invention may provide a robust method for blind SR, based on the property that natural image patches tend to recur abundantly, both across scales of the same image, as well as in an external database of other natural images.

Figure 1B:
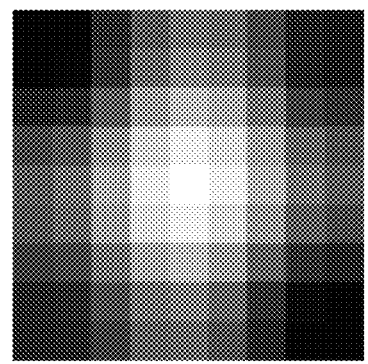
FIG. 1B is a schematic illustration of an optimal SR blur kernel that may be recovered or computed in accordance with the present invention, and which may be used in SR algorithms (and/or in other suitable image-processing algorithms) which may yield improved or superior results.

Reference is made to FIG. 1A, which is a schematic illustration of a prior-art blur kernel 101 that has been used in conventional SR algorithms that yielded low-quality SR results. Reference is also made to FIG. 1B, which is a schematic illustration of an optimal blur kernel 102 that may be recovered or computed in accordance with the present invention, for a particular image, and which may be used in SR algorithms (and/or in other suitable image-processing algorithms) which may yield superior results.

A first novel aspect of the present invention is directed to characterizing the optimal blur kernel relating the unknown high-resolution image to the input low-resolution image. In contrast to the common belief, the optimal blur kernel k is not the PSF. Rather, k is typically narrower than the PSF and, counter-intuitively, k may have negative values, a property not shared by the PSF.

A second novel aspect of the present invention is the estimating, calculating and/or determining of k by relying on patch recurrence across scales of the input low-resolution image, a property which has been previously used for non-blind single-image SR. In particular, the blur kernel that maximizes the similarity of recurring patches across scales of the low-resolution image, is also the optimal SR kernel. Based on this principle, an iterative algorithm may be performed for recovering the optimal blur kernel.

A third novel aspect of the present invention is that a blur kernel estimation algorithm may be created or modified to work with an external database of images, recovering the optimal blur kernel relating the low-resolution image to the external high-resolution image examples. It is noted that other example-based SR algorithms may rely on an external database of low-resolution and high-resolution pairs of patches extracted from a large collection of high-quality example images; however, they assume that the blur kernel k is known a-priori, and they use it to generate the low-resolution versions of the high-resolution image examples.

A fourth novel aspect of the present invention comprises an algorithm that computes the Maximum a Posteriori (MAP) estimate of the blur kernel, as opposed to a joint MAP estimation (over the kernel and high-resolution image) of some conventional algorithms. Additionally, plugging the blur kernel, which is estimated in accordance with the present invention, into existing super-resolution algorithms may result in improved reconstructions that are comparable to using the ground-truth blur kernel. For demonstrating the term "ground-truth kernel", a high-resolution image was down-sampled with a certain ("ground-truth") kernel to yield a low-resolution image; and the proposed methods of the present invention may be used to estimate the blur kernel from the low-resolution image, with a target to estimate a blur kernel as similar as possible to the ground-truth kernel.

The present invention may calculate the correct or optimal SR kernel. Let l denote a low-resolution image. Super-resolution may be viewed as trying to recover a high-resolution image h of the same scene, as if taken by the same camera, but with an optical zoom-in by a factor of α. This may allow the user to view or notice fine details, which may be smaller than a pixel size in l. In the following equations, parentheses are used in continuous-space functions, and square brackets are used in discrete-space functions.

The low-resolution image l may be generated from a continuous-space image $f$ and a continuous-space PSF $b_L$, as follows:

$$l[n] = \int f(x) b_L(n-x) dx \quad (1)$$

The unknown high-resolution image h corresponds to an α times finer grid:

$$h[n] = \int f(x) b_H\left(\frac{n}{\alpha} - x\right) dx \quad (2)$$

In Equation (2), $b_H$ is the high-resolution PSF. For example, in the case of optical zoom, $b_H$ is a narrower (scaled-down) version of $b_L$, namely:

$$b_H(x) = \alpha b_L(\alpha x) \quad (3)$$

Figure 2:
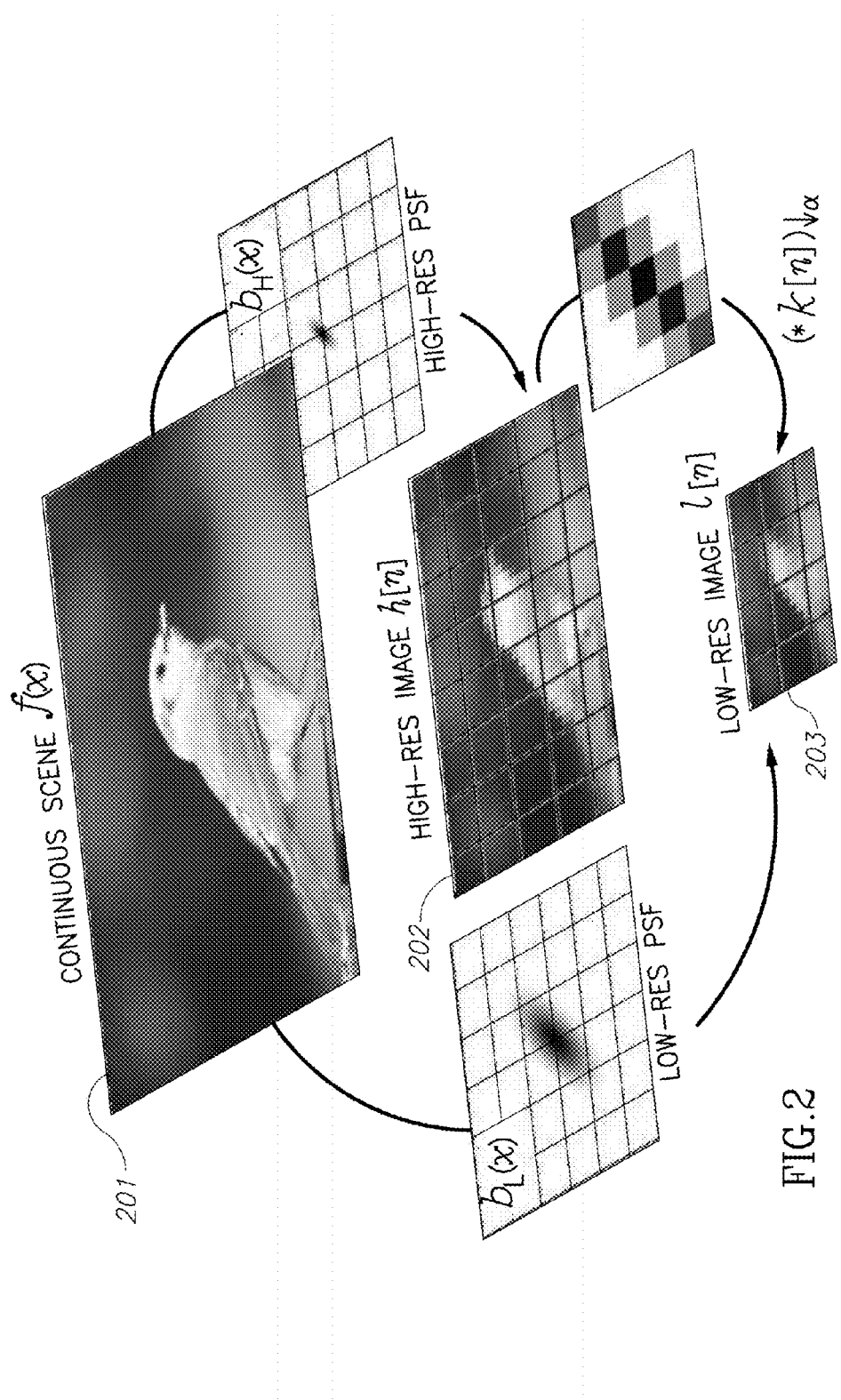
FIG. 2 is a schematic illustration demonstrating a continuous scene, a high-resolution image, and a low-resolution image, and further demonstrating the relations among them, in accordance with the SR algorithm of the present invention.

Reference is made to FIG. 2, which is a schematic illustration demonstrating a continuous scene $f(x)$ 201, a high-resolution image h 202, and a low-resolution image l 203, and further demonstrating the relations among h, l and $f$.

The high-resolution image h and the low-resolution image l are related by blur and subsample, such that:

$$l = (h * k) \downarrow \alpha \quad (4A)$$

$$l[n] = \sum_m h[m] k[\alpha n - m] \quad (4B)$$

In Equation (4B), k is a discrete blur kernel, which is the SR blur kernel that the methods of the present invention may compute and utilize. Although conventional methods often assumed that k is (or resembles) the PSF, in accordance with the present invention the optimal SR kernel is not a simple discretization of the PSF and is not a simple approximation of the PSF.

In accordance with the present invention, substituting Equations (1) and (2) into (4B), and requiring that the equality hold for every possible function $f$, leads to:

$$\sum_m k[m] b_H\left(x - \frac{m}{\alpha}\right) = b_L(x) \quad (5)$$

In accordance with the present invention, $b_L$ is a linear combination of translated versions of $b_H$, and the coefficients of this representation constitute the SR kernel k. It may not always be possible to satisfy the relation (5) exactly. The optimal discrete blur kernel, in such cases, corresponds to the least squares solution of Equation (5).

Reference is made to FIGS. 3A and 3B, which are schematic illustrations of two graph charts 301 and 302, respectively, demonstrating unique features of the optimal blur kernel k in accordance with the present invention. Graph chart 301 demonstrates discretization of the PSF via point-wise sampling; whereas graph chart 302 demonstrates the optimal blur kernel k computed from Equation (5) in accordance with the present invention. As demonstrated, the optimal blur kernel k is not a simple discretization of the low-resolution PSF $b_L(x)$ (computed for α=2).

FIGS. 3A and 3B further demonstrate additional unique features of the optimal blur kernel k which may be obtained by using the methods of the present invention. For example, in accordance with the present invention, counter-intuitively, in certain settings the optimal blur kernel k relating h and l does not share much resemblance to the PSF $b_L$. In particular, the optimal blur kernel k is not guaranteed to assume only positive values, as often postulated in the context of conventional blind-deblurring methods. The optimal blur kernel k may have negative values. The optimal blur kernel k is often narrower than the PSF $b_L$. The optimal blur kernel k often has a more oscillatory nature than the PSF $b_L$. These phenomena are demonstrated in FIGS. 3A-3B for a 1D rectangular PSF.

The physical interpretation of the optimal blur kernel k may be understood from FIG. 2 as composed of two operations: deconvolution with $b_H$, followed by convolution with $b_L$. Thus, while ignoring sampling issues, the optimal blur kernel k may have the same effect as a continuous-domain filter $k_c$ whose Fourier transform is:

$$K_c(\omega) = \frac{B_L(\omega)}{B_H(\omega)} = \frac{B_L(\omega)}{B_L(\omega/\alpha)} \quad (6)$$

In Equation (6), $K_c$, $B_L$, $B_H$ are the Fourier transforms of $k_c$, $b_L$, $b_H$, respectively.

If the PSF is an ideal low-pass filter (a sinc in the image domain; a rect in the Fourier domain), then the kernel $k_c$ indeed equals to the PSF $b_L$, because rect(ω)/rect(ω/α)=rect (ω). However, typically $b_L(\omega)$ is not flat on its entire support, and it smoothly decays towards the high frequencies. Consequently, the division by $b_L(\omega/\alpha)$ amplifies the high frequencies in $K_c(\omega)$ with respect to $b_L(\omega)$, implying that the optimal kernel is usually narrower than the PSF. For example, if the PSF is a Gaussian with width σ, then direct computation shows that $k_c$ is also a Gaussian, but with width of $\sigma\sqrt{1-1/\alpha^2}$, which is smaller than σ. When the PSF has sharp transitions, the kernel often exhibits an oscillatory behavior, as demonstrated in FIG. 3B.

It is noted that least-square problems of the type corresponding to Equation (5), may have a closed form solution, which corresponds to samples of a function whose Fourier transform is:

$$\frac{B_L(\omega) B_H^*(\omega)}{\sum_m |B_H(\omega - 2\pi\alpha m)|^2} \quad (6A)$$

The present invention may estimate the optimal blur kernel, for example, by using internal examples. Recurrence of small image patches (e.g., 5×5 pixels, 7×7 pixels, or the like) across scales of a single natural image was analyzed and quantified in for a wide diversity of images. Such cross-scale patch recurrence has been shown to provide a strong cue for SR from a single image. These SR methods, however, assumed a known blur kernel. In accordance with the present invention, the recurrence of image patches across scales may also be utilized to recover the correct blur kernel k relating the unknown high-resolution image h with the low-resolution image l. Furthermore, in accordance with the present invention, the kernel which maximizes similarity of recurring patches across scales of the low-resolution image l, is also the optimal kernel k between images h and l.

Reference is made to FIG. 4, which is a schematic illustration demonstrating utilization of patch-recurrence across scales for recovering the optimal blur kernel. A small pattern $f(x)$ recurs in a continuous scene 410 at multiple sizes, indicated by stars 411 and 412. In a low-resolution image l (denoted 420), patches q and r are discrete observations of these patterns. Ellipses 451 and 452 depict the camera PSF, relating each pixel in the low-resolution image l 420 to its source area in the continuous scene 410. Equation (10) discussed further below, entails that these low-resolution patches are related by the unknown optimal SR kernel k, such that: $q=(r*k)\downarrow_\alpha$. Further shown is a coarse scale image $l^\alpha$ (denoted 430). $r^\alpha$ is the child patch of r in the coarser image $l^\alpha$ 430. According to Equation (10), if the coarse image is generated with the kernel k, then $r^\alpha=q$.

In accordance with the present invention, the observation that small image patches recur across scales of an image, implies that small patterns recur in the continuous scene at multiple sizes. Let $f(x)$ be such a pattern, recurring elsewhere in the continuous scene as $f(x/\alpha)$, namely, $\alpha$ times larger (depicted by the stars 411 and 412 in the continuous scene 410) These two continuous patterns are observed in the low-resolution image 420 by two discrete patterns of different sizes, contained in patches q and r. In accordance with the present invention, the low-resolution patches q and r are related to each other by blurring and subsampling with the (unknown) optimal blur kernel k derived in Equation (5). This is despite the fact that the two patches are captured with the same low-resolution PSF $b_L$ (depicted by the orange ellipses 451-452). These insights may be utilized in a kernel recovery algorithm.

Patches q and r are generated by the low-resolution PSF $b_L$ as:

$$q[n] = \int f(x)b_L(n-x)dx \quad (7)$$

$$r[n] = \int f\left(\frac{x}{\alpha}\right)b_L(n-x)dx \quad (8)$$

With a change of integration variables, and by using Equation (3), r may be rewritten as:

$$r[n] = \int f(x)\alpha b_L(n-\alpha x)dx = \int f(x)b_H\left(\frac{n}{\alpha}-x\right)dx \quad (9)$$

Equations (7) and (9) entail that q and r are low-resolution and high-resolution manifestation of the same continuous scene $f$, namely: q with the PSF $b_L$ and with grid spacing 1, while r corresponds to a high-resolution version of q with the PSF $b_H$ and grid spacing $1/\alpha$. In accordance with the present invention, q corresponds to a down-sampled version of r with the optimal SR kernel k as derived above, namely:

$$q[n] = \sum_m r[m]k[\alpha n - m] \quad (10)$$

Equation (10) may be verified by substituting Equations (7) and (9) into (10) and using the property (5) of the optimal kernel k.

Equation (10) induces a linear constraint on the unknown coefficients of the kernel k. Multiple such patch pairs in the low-resolution image would thus allow recovery of the optimal kernel k. It is noted that, as demonstrated in FIG. 4, the right-hand side of Equation (10) corresponds to the coarser-scale patch $r^\alpha$ in the coarser version $l^\alpha$ of the input image l, namely $r^\alpha=q$ (see the coarser image 430 in FIG. 4). Therefore, detecting Nearest-Neighbors (NNs) for the patch q in the coarser image $l^\alpha$ provides candidate parents rɛl for q. In this strategy, however, to form the "correct" coarse image $l^\alpha$ we need to know the optimal kernel k. Nonetheless, in accordance with the present invention, Equation (10) implies that the correct blur kernel k is also the one which maximizes similarity of NNs across scales in the low-resolution image l. The present invention may use this property in the algorithm to obtain the optimal kernel k.

An algorithm in accordance with the present invention may utilize an iterative approach. For example, the algorithm starts with some initial guess $\hat{k}$, for k, such as a delta function, and uses it to down-sample l. Next, for each small patch $q_i$ in l, the algorithm finds a few nearest neighbors (NNs) in $l^\alpha$ and regards the large patches right above them as the candidate "parents" of $q_i$. The so found parent-child pairs (q, r) are then used to construct a set of linear equations (using Equation (10)), which is solved using least-squares to obtain an updated $\hat{k}$. These steps may be repeated until convergence.

Figure 5A:
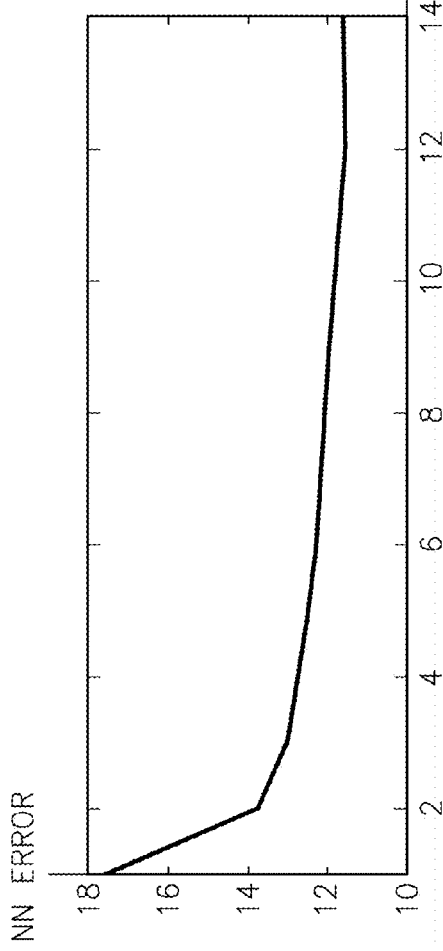
FIG. 5A is a graph of Nearest Neighbor error versus the number of iterations, demonstrating convergence of the SR kernel recovery algorithm of the present invention.
Figure 5B:
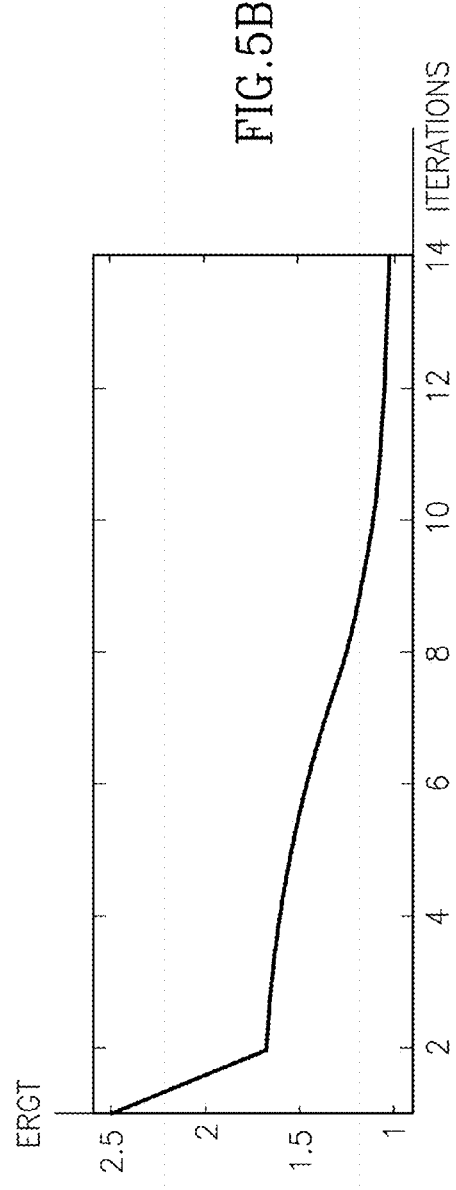
FIG. 5B is a graph of the relative SR construction error, using an SR algorithm, versus the number of iterations, demonstrating convergence of the SR kernel recovery algorithm of the present invention.

It is noted that the least squares step does not recover the initial kernel $\hat{k}$ that was used to down-sample the image, but rather a kernel that is closer to the true kernel k. This is because, even with an inaccurate kernel, many of the NNs of $q_i$ are located at the same image coordinates in $l^\alpha$ as the NNs corresponding to the correct kernel k. Thus, in each iteration the number of correct NNs increases, and the estimate gets closer to the correct kernel k. As long as the root mean squared error (RMSE) between patches in l and their NNs in $l^\alpha$ keeps decreasing, the algorithm may keep iterating. The applicants' experiments show that this process converges to the correct kernel k quickly (typically within about 15 iterations), and is insensitive to the choice of initial guess $\hat{k}$. For example, FIG. 5A demonstrates the convergence of the algorithm, depicting a graph of the NN error versus the number of iterations; and FIG. 5B further demonstrates the convergence of the algorithm, depicting a graph of the relative SR construction error (ERGT) versus the number of iterations. The ERGT may be defined as the ratio between the SR error with the recovered kernel and the SR error with the ground-truth kernel.

In accordance with the present invention, not all patches in l need to recur (have similar patches) in the coarse image $l^\alpha$ in order to be able to recover the optimal kernel k. For example, recovering a 7×7 discrete kernel k relating high-resolution image h with low-resolution image l (i.e., having 49 unknowns) may be done with as little as one good 7×7 patch recurring in scales 1 and $1^\alpha$ (i.e., providing 49 equations). When using multiple patches, the NNs should intuitively be weighted according to their degree of similarity to the query patches $\{q_i\}$, so that good NNs contribute more than their poor counterparts. Some implementations may add a regularization term to the least-squares problem solved in each iteration, in order to impose smoothness constraints on the kernel.

The present invention may estimate the optimal blur kernel by using external image examples. Some example-based SR algorithms rely on an external database of high-resolution patches extracted from a large collection of high-resolution images; but such algorithms assume that the blur kernel k is known a-priori, and use it to downsample the images in the database in order to obtain pairs of low-resolution and high-resolution patches. These pairs may be used to learn how to "undo" the operation of downsampling with k, so that, given an input image l, its corresponding high-resolution version h can be reconstructed. The following discussion explains the physical interpretation of the optimal kernel k when using an external database of examples, and then shows how to estimate this optimal kernel k.

Some embodiments of the present invention may assume, for demonstrative and simplified purposes, that all the high-resolution images in the external database were taken by a single camera with a single PSF. Since the external images form examples of the high-resolution patches in SR, this implicitly induces that the high-resolution PSF $b_H$ is the PSF of the external camera. The external camera, however, is most likely not the same as the camera imaging the low-resolution input image l (the "internal" camera). Thus, the high-resolution PSF $b_H$ and the low-resolution PSF $b_L$ may not necessarily have the same profile (e.g., one is no longer a scaled version of the other). It is noted that the previous discussion remains valid; namely, the kernel k relating the high-resolution and low-resolution images is still given by Equations (5) and (6A) in these settings, but with a PSF $b_H$ of a different camera. According to Equation (6), the intuitive understanding of the optimal kernel k when using external high-resolution image examples is (in the Fourier domain):

$$K_c(\omega) = \frac{B_L(\omega)}{B_H(\omega)} = \frac{\mathcal{PSF}_{Internal}(\omega)}{\mathcal{PSF}_{External}(\omega)} \quad (11)$$

Thus, in SR from external examples the high-resolution patches correspond to the PSF $b_H$ of the external camera, and the low-resolution patches generated from them by down-sampling with k should correspond, by construction, to the low-resolution PSF $b_L$ of the internal camera. This k is generally unknown (and is assumed by external SR methods to be some default kernel, like a Gaussian kernel or a bicubic kernel).

The present invention may determine the optimal kernel k for external SR in a similar method as for internal SR (as described above), with the exception that the "parent" patches $\{r_i\}$ are now searched in an external database of images, rather than within the input image. As in the internal SR, the algorithm may start with an initial guess $\hat{k}$ to the kernel k. The algorithm then down-samples the external patches $\{r_i\}$ with $\hat{k}$ to obtain their low-resolution versions $\{r_i^\alpha\}$. Then each low-resolution patch q in the low-resolution image l searches for its NNs among $\{r_i^\alpha\}$, to find its candidate parents $\{r_i\}$ in the database. These "parent-child" pairs (q, r) are used to recover a more accurate kernel $\hat{k}$ via a least-squares solution to a system of linear equations. This process may be repeated iteratively until convergence to the final estimated kernel $\hat{k}$.

Figure 6:
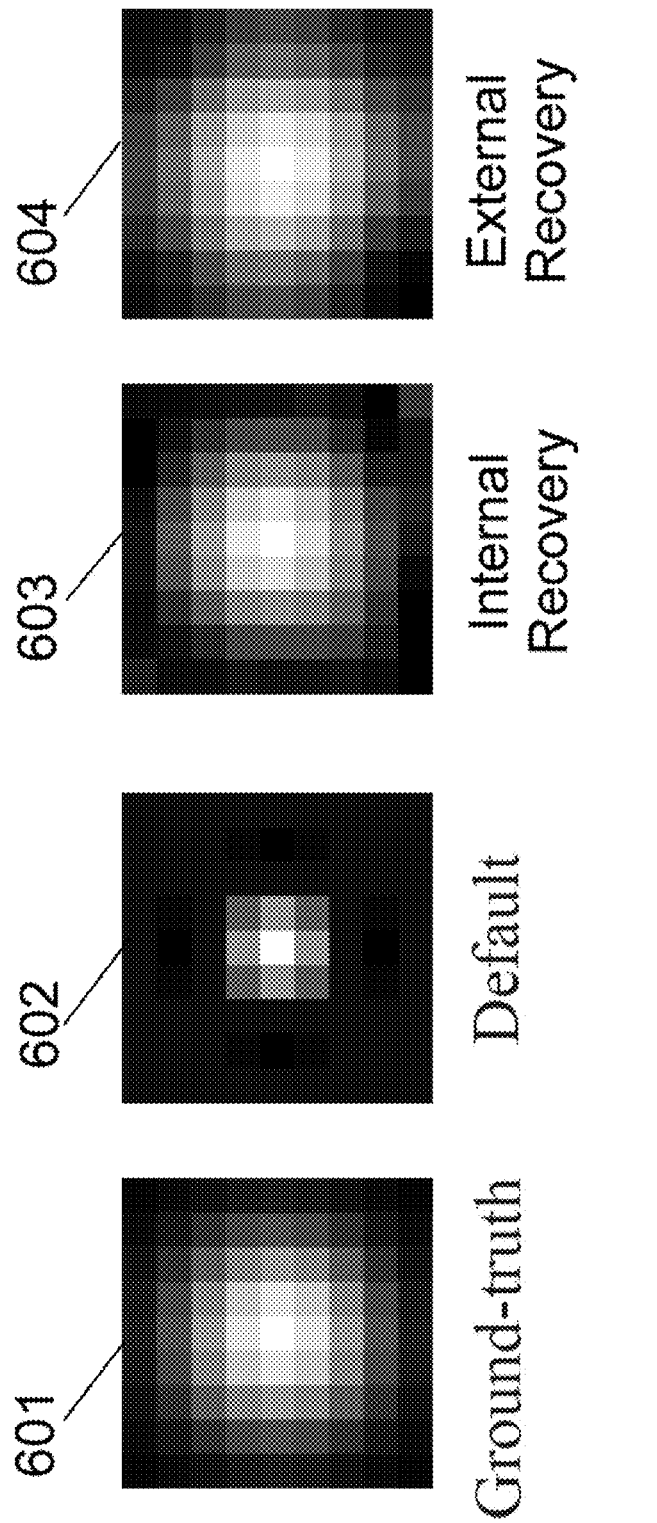
FIG. 6 is an illustration of four blur kernels which may be used for SR or other image-processing algorithms.

Reference is made to FIG. 6, which is an illustration of four blur kernels 601-604 which may be used for SR or other image-processing algorithms. Kernel 601 is the ground-truth kernel. Kernel 602 is a default bicubic kernel. Kernel 603 is a kernel estimated by internal recovery, namely, by utilizing image patch recurrence within the image. Kernel 604 is a kernel estimated by external recovery, namely, by utilizing image patch recurrence within images in an external database of images. Applicants have realized that the internal-recovered kernel 603 and/or the external-recovered kernel 603, are much closer to the ground-truth kernel 601 than the default bicubic kernel 602.

The kernel estimation algorithms of the present invention (both the internal approach and the external approach) may be viewed as a principled Maximum a Posteriori (MAP) estimation. Some existing blind SR approaches attempt to simultaneously estimate the high-resolution image h and the kernel k, by assuming a prior on each of them and maximizing the posterior probability p(h, k|l). This $MAP_{h,k}$ approach may lead to inaccurate estimates of k. This is in contrast to the $MAP_k$ method, which seeks to estimate k alone, by maximizing its marginal posterior, p (k|l). In accordance with the present invention, the algorithm may compute the $MAP_k$ estimate based on a nonparametric prior.

Reference is made to Algorithm (1), which demonstrates MAP kernel estimation in accordance with the present invention:

---

Algorithm (1)

Input: query low-res patches $\{q_1,...,q_M\}$, example high-res patches $\{r_1,...,r_N\}$
Output: The $MAP_k$ estimate $\hat{k}$
initialize $\hat{k}$ with a delta function;
for t = 1,...,T do
    1. down-sample example image patches
    2. find NNs and compute weights
    3. update $\hat{k}$
end

---

In Algorithm (1), the step of down-sampling example image patches may utilize the following equation:

$$r_j^\alpha = R_j \hat{k} \quad (11A)$$

In Equation (11A), $\hat{k}$ is the column-vector representation of the kernel, and $R_j$ is a matrix corresponding to convolution with $r_j$ and sub-sampling by $\alpha$.

In Algorithm (1), the step of finding NNs may be done according to the squared norm between the patches, and computing the weights may utilize the following equation, for each $r_i^\alpha$ which is a NN of $q_i$:

$$\omega_{ij} = \frac{\exp\left\{-\frac{1}{2}\|q_i - r_j^\alpha\|^2/\sigma^2\right\}}{\sum_j \exp\left\{-\frac{1}{2}\|q_i - r_j^\alpha\|^2/\sigma^2\right\}} \quad (11B)$$

In Equation (11B), $q_i$ is the column-vector representation of the low-resolution patch.

In Algorithm (1), the step of updating $\hat{k}$ may utilize the following equation:

$$\hat{k} = \left(\frac{1}{\sigma^2}\sum_{i,j} w_{ij} R_j^T R_j + C^T C\right)^{-1} \sum_{i,j} w_{ij} R_j^T q_i \quad (11C)$$

In Equation (11C), C may be a matrix that corresponds to derivatives in the horizontal and vertical directions.

The external kernel estimation method utilizes a collection of image patches $\{r_i\}$ from an external database as candidates for constituting "parents" to small patches from the input image 1. The internal kernel estimation method utilizes large patches from the input image 1 itself, as potential "parents". Common to both approaches is the utilization of a set of patches $\{r_i\}$ which constitute a good nonparametric representation of the probability distribution of high-resolution patches acquired with the PSF $b_H$. Subsequently, the method may thus assume that it has access to a database patches $\{r_1 \ldots r_N\}$ of image patches, independently drawn from the distribution p(h).

In accordance with the present invention, assume that the low-resolution image 1 corresponds to a noisy down-sampled version of the high-resolution image h. Then, every patch $q_i$ in 1 may be expressed in terms of the corresponding high-resolution patch $h_i$ in h as:

$$q_i = K h_i + n_i \quad (12)$$

In Equation (12), $h_i$ and $q_i$ are column vectors representing the high-resolution and low-resolution patches; K is a matrix that corresponds to convolution with k and sub-sampling by a; and $n_i$ is noise. The algorithm may assume that $\{h_i\}$, $\{n_i\}$ and k are statistically independent (e.g., if the query patches $\{q_i\}$ are extracted from distant locations in the low-resolution image 1). Accordingly, the MAP$_k$ estimate is given by:

$$\hat{k} = \arg\max_k p(k) \prod_{i=1}^{M} p(q_i | k) \quad (13)$$
$$= \arg\max_k p(k) \prod_{i=1}^{M} \int_{h_i} p(q_i | h_i, k) p(h_i) dh_i$$

In Equation (13), M is the number of patches extracted from 1. The above expression may be written in terms of the distribution of the noise. For concreteness, if $n_i$ is normally distributed with zero mean and covariance $\sigma^2 I$, then Equations (13) becomes:

$$\arg\max_k p(k) \prod_{i=1}^{M} \int_h \exp\left\{-\frac{\|q_i - Kh\|^2}{2\sigma^2}\right\} p(h) dh \quad (14)$$

The above utilized the fact that $\{h_i\}$ are identically distributed. Many image processing methods utilize parametric priors p(h) (e.g., which promote sparsity of image gradients). However, in many of these parametric families, the integral in Equation (14) cannot be calculated in closed form, thus requiring approximate solutions. In contrast, the present invention may approximate p(h) in a non-parametric method by using the training patches $\{r_j\}$.

In accordance with the present invention, the integral in Equation (14) may be written in terms of an expectation over h, so that the objective in (14) may be expressed as:

$$\max_k p(k) \prod_{i=1}^{M} \mathbb{E}_h\left[\exp\left\{-\frac{\|q_i - Kh\|^2}{2\sigma^2}\right\}\right] \quad (15)$$

This expectation may be approximated by an empirical mean (sample mean) over all high-resolution training patches $\{r_i\}$:

$$\max_k p(k) \prod_{i=1}^{M} \frac{1}{N} \sum_{j=1}^{N} \exp\left\{-\frac{\|q_i - Kr_j\|^2}{2\sigma^2}\right\} \quad (16)$$

Under the assumption on $\{r_i\}$, this approximation is guaranteed to tend to the MAP$_k$ solution as N tends to infinity. Therefore, for a large enough collection of training patches, Equation (16) is practically equivalent to the MAP$_k$ criterion.

In order to emphasize the dependence of Equation (16) on k, it is noted that the term $Kr_j$ may be equivalently written as $R_j k$, where k is the column-vector representation of the kernel and $R_j$ is a matrix corresponding to convolution with $r_j$ and sub-sampling by $\alpha$. Furthermore, a reasonable prior for k is expressed in the following, in which C may be chosen (e.g., to penalize for non-smooth kernels):

$$p(k) = c \cdot \exp\{-\|Ck\|^2/2\} \quad (16A)$$

With these substitutions (and taking the log), Equation (16) is equivalent to:

$$\min_k \frac{1}{2}\|Ck\|^2 - \sum_{i=1}^{M} \log\left(\sum_{j=1}^{N} \exp\left\{-\frac{\|q_i - R_j k\|^2}{2\sigma^2}\right\}\right) \quad (17)$$

For this optimization, a kernel k achieving good score is such that if it is used to down-sample the training patches in the database, then each of the query patches $\{q_i\}$ should find as many good nearest neighbors (NNs) as possible.

Minimizing Equation (17) may be done in an iterative manner, such that each iteration down-samples the training patches using the current estimate $\hat{k}$ of k, finds nearest neighbors to the query patches $\{q_i\}$, and updates $\hat{k}$ by solving a weighted least-squares problem. More specifically, setting the gradient of Equation (17) to zero, leads to a version of the iteratively re-weighted least squares (IRLS) procedure, as outlined in Algorithm (1). Each equation induced by an NN $r^\alpha$ of a low-resolution patch q is weighted by the degree of similarity between $r^\alpha$ and q. It is noted that in practice, only those patches in the database whose distance to q is small (not much larger than $\sigma$) are assigned non-negligible weights, so that the number of required NNs per low-resolution patch is typically small. This interpretation may provide a more concrete methodology for implementing the internal and external methods described above.

Applicants have validated the benefit of using the SR kernel estimation methods of the present invention, both empirically (on low-resolution images generated with ground-truth data), as well as visually on real images. In a demonstrative experiment, the low-resolution patches q and $r^\alpha$ were 5×5 patches. Some experiments were run with scaling factors of $\alpha=2$ (namely, SR×2) and $\alpha=3$ (namely, SR×3); and typically solved for 9×9 kernels, 11×11 kernels, or 13×13 kernels. The noise level was assumed to be $\sigma=10$.

For the external kernel recovery, some experiments used a database of 30 natural images downloaded from the Internet (most likely captured by different cameras). The regularization in the least-squares stage of each iteration (see Algorithm (1)) was performed with a matrix C corresponding to derivatives in the horizontal and vertical directions.

In order to quantify the effect of the estimated kernel $\hat{k}$ on SR algorithms, some experiments may utilize two measures. A first measure may be an Error Ratio to Ground Truth (ERGT), which may measure the ratio between the SR reconstruction error with the estimated kernel $\hat{k}$ and the SR reconstruction error with the ground-truth kernel k, namely:

$$\text{ERGT} = \|h - \hat{h}_{\hat{k}}\|^2 / \|h - \hat{h}_k\|^2 \quad (17A)$$

Values close to 1 indicate that the estimated kernel $\hat{k}$ is nearly as good as the ground-truth kernel k. A second measure is the Error Ratio to Default (ERD), which quantifies the benefit of using the estimated kernel $\hat{k}$ over the default (typically bicubic) kernel $k_d$, and is defined as:

$$\text{ERGT} = \|h - \hat{h}_{\hat{k}}\|^2 / \|h - \hat{h}_{k_d}\|^2 \quad (17B)$$

ERD values that are much smaller than 1, indicate a large improvement.

Experiments by the Applicants showed that plugging the recovered kernel $\hat{k}$ into conventional SR methods may lead to substantial improvement in the resulting high-resolution image over using their assumed default (bicubic) kernel. It is noted that the recovered kernels are much wider than the default (bicubic) kernel. The differences in the resulting high-resolution images are observed both visually, and numerically when compared to the ground-truth image. For example, in some experiments that pertained to a specific image and attempted to estimate an optimal blur kernel closest to the ground-truth kernel, a first SR algorithm that was adapted to utilize internal kernel recovery achieved ERD=0.45 and ERGT=1.02; and a second SR algorithm that was adapted to utilize external kernel recovery achieved ERD=0.43 and ERGT=1.01.

Some experiments by the Applicants showed the convergence of the internal kernel estimation algorithm applied to a low-resolution input image. For example, the RMSE between patches in the image and their NNs in the coarser scale rapidly decreases; demonstrating that the algorithm of the present invention indeed maximizes the similarity of recurring patches across scales. Moreover, the ERGT of the SR reconstruction decreases with each iteration towards 1; thereby implying that the estimated kernel converges to SR performance of the ground-truth kernel.

The iterative algorithm of the present invention is fairly insensitive to the initialization of the kernel. In an experiment by the Applicants, an image was obtained by down-sampling a large image by a factor of 3 with a Gaussian kernel. The experiment ran 30 iterations of both the internal and the external algorithms, each time with a different initial kernel. These include a delta function, as well as randomly sampled kernels. In the experiment, both algorithms consistently converged to estimated kernels which are close to the ground-truth kernel, regardless of the initial guess.

Figure 7:
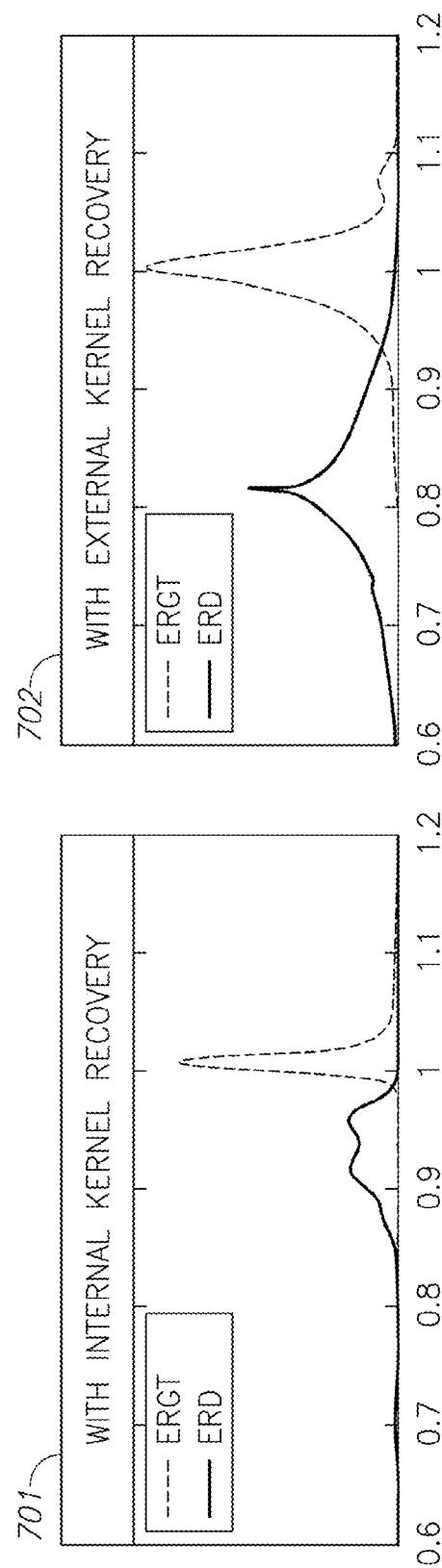
FIG. 7 is an illustration of two charts demonstrating the error measures incurred by using internally-recovered kernels and externally-recovered kernels.

In order to empirically validate the algorithm of the present invention, the Applicants further performed a large statistical analysis on hundreds of images with randomly varying ground-truth kernels. FIG. 7 demonstrates the error measures incurred by using internally-recovered kernels (chart 701) and externally-recovered kernels (chart 702), in accordance with the present invention. In the experiment, 100 test images were down-sampled by a factor of 3, each with several 7×7 kernels. The kernels were drawn randomly from the prior on k assumed as discussed above (with the matrix C corresponding to derivatives in the horizontal and vertical directions), i.e., randomly sampled smooth kernels. The plots in charts 701-702 depict the distribution of the error measures. As demonstrated, SR with the estimated kernel performs similarly to SR with the ground-truth kernel (ERGT≈1) and performs better than with the default kernel (ERD<1).

Further experiments by the Applicants demonstrated that the results of using the present invention's internal recovery scheme on real images yielded visually-superior results, relative to SR utilizing the default kernel; in both historic photographs downloaded from the Internet, as well as in real images captured by a smartphone.

In accordance with the present invention, contrary to the common belief, the PSF of the camera is the wrong blur kernel k to use in SR algorithms. The correct blur kernel k may be recovered directly from the low-resolution image, by utilizing the recurrence of small image patches, either at coarser scales of the same image, or in an external database of images. This is shown to be a principled MAP estimation of k, and leads to a significant improvement in SR results, as well as in results of other image-processing algorithms that may utilize the blur kernel.

The present invention may be used in conjunction with classic up-scaling methods. Although the experiments herein demonstrated the approach on patch-based single-image SR techniques, the methods and algorithm of the present invention may be used in conjunction with any suitable method or algorithm that requires or utilizes knowledge of the blur kernel. This includes, for example, multi-image SR settings, in which each image may experience a different blur, generalized interpolation methods such as consistent interpolation the minimax regret method and other techniques (e.g., hybrid Wiener filter, dense grid recovery schemes).

Image de-blurring, or the process of removing blur without increasing resolution, may be regarded a special case of image SR, corresponding to a scale factor of α=1. Accordingly, the blind SR algorithm of the present invention, which may utilize an external database of images, may similarly be used as a blind de-blurring method, by setting α=1.

In accordance with the present invention, the discrete blur kernel k[n] may be estimated from the low-resolution image l. In some cases, it may be desired to estimate the continuous-space PSF $b_L(x)$. Once an estimate of the discrete blur kernel k[n] is available, an estimate of the continuous-space PSF $b_L(x)$ may be obtained by utilizing Equation (5). The continuous-space PSF $b_L(x)$ may be used, for example, to de-blur an image, in order to obtain a sharper image (even without increasing resolution). A more detailed discussion of estimating a blur kernel for enhancing image deblurring is further discussed herein below.

The blind SR methods of the present invention may be used in various applications, for example, medical imaging, defense and security imaging systems, conversion of television broadcasts to high-definition (HD), and other suitable hardware systems and/or software modules that may require or may utilize up-scaling of an image to a larger size. The methods of the present invention may be regarded as performing "digital zoom", by a camera, a camcorder, a mobile phone, a smartphone, a tablet, or other suitable electronic devices, as well as in image processing or photo editing software applications. In some conventional devices, the "digital zoom" function implements a simple image up-scaling algorithm that does not truly recover details that are smaller than a pixel size; and even with more advanced SR techniques, the results of such "digital zoom" are often unsatisfactory. In contrast, the algorithms of the present invention may boost the performance of any SR technique, thereby enabling high-quality "digital zoom".

The present invention may be used in conjunction with non-uniform blur. For example, an image may be affected by motion blur that is non-uniform across the scene. Such cases may be handled by running the algorithm of the present invention separately on different parts or regions of the image, and extracting a different blur kernel for each such part or region of the image.

The present invention may be used for Space-Time Super-Resolution. For example, SR may be applied not only to increase spatial resolution, but also to increase temporal resolution of video sequences. In this context, it may be required to know the temporal blur, which is associated with the temporal integration of the sensor array elements. The techniques of the present invention may be used to recover the temporal or spatio-temporal (three-dimensional) blur kernel required for performing temporal or spatio-temporal SR. This may be done both with an external database of 3D spatio-temporal patches, or from the input video itself (as such patches tend to recur across scales of natural videos).

The present invention further comprises methods, algorithms, and systems for blind deblurring of an image, by utilizing internal patch recurrence. In accordance with the present invention, recurrence of small image patches across different scales of a natural image may be used for "blind-deblurring", namely, removal of an unknown blur from a blurry image. While patches repeat 'as is' across scales in a sharp natural image, this cross-scale recurrence significantly diminishes in blurry images.

For example, the cross-scale patch recurrence is strong in sharp images and weak in blurry images. Small patches (e.g., 5×5 pixels, or 7×7 pixels) tend to recur across scales in an "ideal" (sharp) natural image x; namely, if natural image x is down-scaled by a factor of α, then for most patches in image x, there exist almost identical patches in the down-scaled image $\hat{x}^\alpha$. In contrast, in a blurry image y that takes the form of Equation (18) discussed herein, this is no longer true. The similarity between patches in the blurry image y and in its down-scaled version $y^\alpha$ is significantly reduced. Patches in the down-scaled version $y^\alpha$ tend to be α-times sharper than their corresponding patches in the blurry image y. In accordance with the present invention, down-scaling the blurry image generates a pool of sharper patches, which may be used as a prior for removing the blur in the blurry image y.

The method of the present invention may utilize these deviations from ideal patch recurrence, as a cue for recovering the underlying (unknown) blur kernel. More specifically, the method searches for the blur kernel k, such that if its effect is "undone" (if the blurry image is deconvolved with k), then the patch similarity across scales of the image will be maximized. Experimental evaluations indicate that the blind deblurring method of the present invention outperforms conventional blind deblurring methods.

If the blur is uniform (i.e., same blur across the entire image), the blurry image y may be modeled as having been obtained from the desired sharp image x as:

$$y = k * x + n \quad (18)$$

In Equation (18), the symbol * denotes convolution; k is some blur kernel and n is noise.

Since both the blur kernel k and the sharp image x are unknown, and since many different pairs of x and k may result in the same blurry image y, many conventional blind deblurring methods rely heavily on the availability of prior knowledge on x.

The present invention comprises a method for blind-deblurring, which is based on the internal patch recurrence property within a single natural image. Almost any small image patch in a sharp natural image (e.g., 5×5 or 7×7 pixels) re-appears "as is" (without shrinking the patch) in smaller scaled-down versions of the image. The utilization of external patch-priors (extracted from a large collection of natural images) has been compared to the utilization of internal patch-priors (extracted from within the image). Although limited in their number, the internal image-specific patches provide better examples (a stronger prior) with stronger predictive power than a generic external collection of natural patches. In accordance with the present invention, this superiority of the internal image-specific patches is true for blind-deblurring. In fact, utilizing the internal patch recurrence prior may lead to better results than all previous blind-deblurring methods, including conventional external patch-based method of deblurring.

It is noted that employing the internal patch prior in the case of blind deblurring may be challenging. While externally, all patches are sharp, internally all the patches of a blurry image suffer from the blur. Nevertheless, while the blur is strong in the original scale, the blur decreases at coarser scales of the image. Thus, sharper image patches "emerge" in coarser scales of the blurry image. The patches in coarser image scales may thus serve as a good patch prior (sharper examples) for deblurring the input scale. This may allow recovery of the unknown blur kernel.

While patches repeat across scales in a sharp natural image, this cross-scale recurrence significantly diminishes in blurry images. The present invention utilizes these deviations from ideal patch recurrence as a cue for recovering the underlying (unknown) blur kernel. This is done by seeking a blur kernel k, such that if its effect is undone (namely, if y is deconvolved by k), the patch similarity across scales will be maximized. More specifically, we look for an image $\hat{x}$ and a blur kernel $\hat{k}$ such that on the one hand, $\hat{x}$ satisfies the patch recurrence property (namely, strong similarity between patches across scales of $\hat{x}$), and, on the other hand, $\hat{k} * \hat{x}$ is close to the blurry image y. This may be done by solving the optimization problem:

$$\operatorname*{argmin}_{\hat{x},\hat{k}} \|y - \hat{k} * \hat{x}\|^2 + \lambda_1 \rho(\hat{x}, \hat{x}^\alpha) + \lambda_2 \|\hat{k}\|^2 \quad (19)$$

In optimization problem (19), $\hat{x}^\alpha$ is an α-times smaller version of $\hat{x}$; the data term is $\|y - \hat{k} * \hat{x}\|^2$; the image prior is $\rho(\hat{x}, \hat{x}^\alpha)$; and the kernel prior is $\|\hat{k}\|^2$, a regularizer on the kernel k. The image prior $\rho(\hat{x}, \hat{x}^\alpha)$ is a function that measures the degree of dissimilarity between patches in $\hat{x}$ and their Nearest Neighbor patches (NNs) in the down-scaled version $\hat{x}^\alpha$.

Optimization problem (19) may be interpreted as a joint MAP estimation of x and k. With simple parametric priors (e.g., those that promote sparsity of image gradients) the joint MAP strategy often under-estimates the amount of blur, and thus results in a blurry image $\hat{x}$. However, the nonparametric prior term $\rho(\hat{x}, \hat{x}^\alpha)$ of the present invention, does not suffer from this bias towards blurry reconstructions $\hat{x}$, and may therefore yield improved results. This is due to the fact that small patches in a natural sharp image $\hat{x}$ typically have similar patches (NNs) in its down-scaled version in $\hat{x}^\alpha$; and therefore, for a sharp $\hat{x}$ the penalty $\rho(\hat{x},\hat{x}^\alpha)$ is small. In contrast, patches in a blurry $\hat{x}$ are less similar to patches in its down-scaled version $\hat{x}^\alpha$; and therefore, for a blurry image $\hat{x}$ the penalty $\rho(\hat{x}, \hat{x}^\alpha)$ is large.

The present invention may solve the optimization problem (19), namely, seeking the blur kernel $\hat{k}$ such that, if its effect is undone (if y is deblurred by $\hat{k}$), will maximize the cross-scale similarity of patches in the deblurred image $\hat{x}$. Since no closed form solution is available for problem (19), the present invention may utilize an iterative process, in which each iteration comprises three steps, as demonstrated for example in Algorithm (2):

---
Algorithm (2)
---
Input: Blurry image y
Output: Blur kernel k
Initialize $\hat{k} = \delta$ and $\hat{x} = y$;
for t = 1,...,T do
    1. Image Prior Update
    2. Deblurring
    3. Kernel Update
end
---

In Algorithm (2), the iterative process is initialized with the blur kernel $\hat{k}$ being a delta function, and $\hat{x}$ is initially the blurry input image y. In each iteration, the first step (updating the image prior) may comprise down-scaling image $\hat{x}$ by a factor of $\alpha$ to obtain a down-scaled version $\hat{x}^\alpha$. In each iteration, the second step (deblurring) may comprise minimizing the objective function in problem (19) with respect to $\hat{x}$ holding $\hat{k}$ and $\hat{x}^\alpha$ fixed. In each iteration, the third step (updating the kernel) may comprise minimizing the objective function in problem (19) with respect to $\hat{k}$, holding $\hat{x}$ and $\hat{x}^\alpha$ fixed.

Even though Algorithm (2) iterates between an x-step (updating $\hat{x}$ with $\hat{k}$ fixed) and a k-step (updating $\hat{k}$ with $\hat{x}$ fixed), Algorithm (2) is different from conventional algorithms which might appear similar. Particularly, the x-step in Algorithm (2) is fundamentally different from conventional algorithms. Rather than using a fixed generic prior on natural images, the present invention utilizes an evolving image-specific prior based on patches extracted from the down-scaled (sharper) version of the blurry image. Since the estimated $\hat{x}$ gets sharper from iteration to iteration, in accordance with the present invention, the image prior also changes from iteration to iteration.

Step 1 of Algorithm (2) operates to produce an image version $\hat{x}^\alpha$, which serves as a pool of sharper patches. If we shrink a blurry image $\hat{x}$ by a factor of $\alpha$, then the result version $\hat{x}^\alpha$ contains $\alpha$-times less the amount of blur. For example, if we scale-down the image $\hat{x}$ by a factor of $\alpha=2$, then an edge smeared over 10 pixels in image $\hat{x}$ would appear smeared over only 5 pixels in the down-scaled version $\hat{x}^\alpha$. However, the scaled-down image is also $\alpha$-times smaller than $\hat{x}$. In accordance with the present invention, it may be proven that despite the fact that $\hat{x}^\alpha$ is smaller, the pool of small patches (e.g., 5×5 pixels) extracted from version $\hat{x}^\alpha$ is roughly the same as the pool of small patches extracted from the larger image $\hat{x}^\alpha$ only $\alpha$-times sharper. This is due to the recurrence of small patterns at various sizes in the continuous scene.

Step 1 of Algorithm (2) resulted in a down-scaled image version $\hat{x}^\alpha$, which provides a pool of patches that are $\alpha$-times sharper than those in the image estimate $\hat{x}$. These patches are used in Step 2 of Algorithm (2) as examples for how patches in $\hat{x}$ should look like if we were to sharpen them by a factor of $\alpha$. To construct a new $\alpha$-times sharper image $\hat{x}$, step 2 of Algorithm (2) minimizes the objective function in problem (19) with respect to $\hat{x}$ while holding $\hat{k}$ and $\hat{x}^\alpha$ fixed. This is in fact the deblurring of image y by the current kernel estimate $\hat{k}$, where the prior is represented by the patches in $\hat{x}^\alpha$. For example, in the first iteration (in which $\hat{k}=\delta$), we solve:

$$\underset{\hat{x}}{\operatorname{argmin}} \|y - \hat{x}\|^2 + \lambda_1 \rho(\hat{x}, \hat{x}^\alpha) \qquad (20)$$

This results in an image $\hat{x}$, which is close to the input image y, but at the same time its patches are similar to the $\alpha$-times sharper patches in: $\hat{x}^\alpha$. Therefore, the image $\hat{x}1$ recovered in the first iteration contains $\alpha$-times less the amount of blur than image y. At the second iteration, the image in $\hat{x}2$ is $\alpha$-times sharper than $\hat{x}1$, and thus $\alpha^2$-times sharper than image y. The image $\hat{x}l$ at the l-th iteration is $\alpha^l$ times sharper than the input image y, and tends to x for large l.

Step 3 in Algorithm (2) updates the kernel estimate $\hat{k}$, by computing the blur between the current deblurred estimate $\hat{x}$ and the input image y. Thus, in the l-th iteration, the kernel estimate $\hat{k}l$ is such that $y=\hat{k}l*\hat{x}l$. For large enough l, the image estimate $\hat{x}l$ converges to x, and accordingly the kernel estimate $\hat{k}l$ converges to k, which is the output of Algorithm (2).

Figure 8:
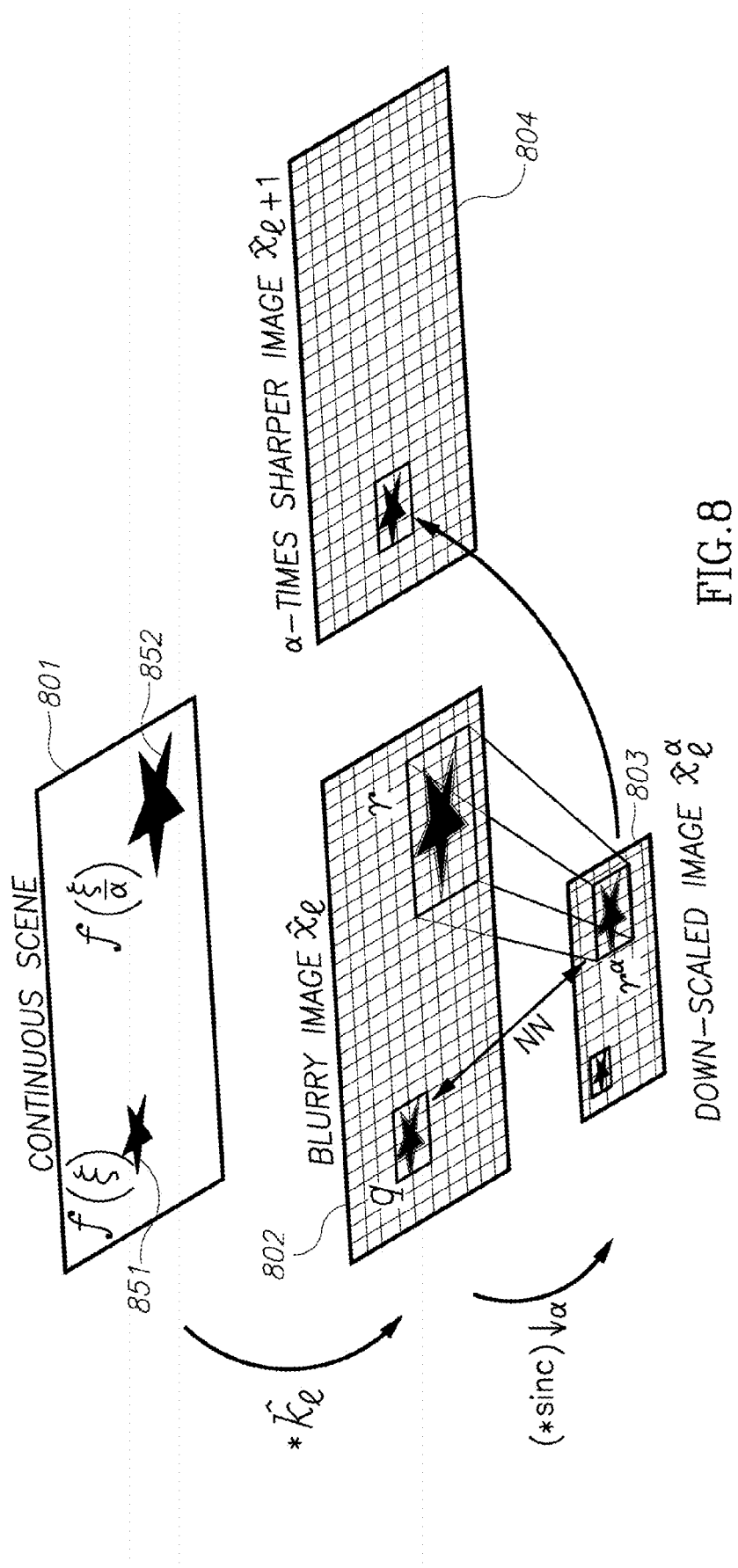
FIG. 8 is a schematic illustration of images demonstrating enforcement of cross-scale patch prior in each iteration of the blind-SR algorithm in accordance with the present invention.

Reference is made to FIG. 8, which is a schematic illustration of images 801-804 demonstrating enforcement of the cross-scale patch prior in each iteration of Algorithm (2). Referring to image 801, a small pattern recurs in a continuous scene at multiple sizes (indicated by stars 851 and 852). Referring to image 802, at the l-th iteration, the image estimate $\hat{x}l$ corresponds to the convolution of the scene with the kernel estimate $\hat{k}l$; and thus the two patterns in the scene appear as two blurry patches q and r in the image estimate $\hat{x}l$. Referring to image 803, in the down-scaled version $\hat{x}_l^\alpha$, the child patch of r contains the same structure as the patch q in $\hat{x}l$, only $\alpha$-times sharper. Referring to image 804, Algorithm (2) constructs a sharper image estimate $\hat{x}l+1$ such that each of its patches is constrained to be similar to its sharper version in $\hat{x}_l^\alpha$ (e.g., the new version of q in $\hat{x}l+1$ should be similar to the sharper patch $r^\alpha$ in $\hat{x}_l^\alpha$).

Referring again to step 1 of Algorithm (2), the purpose of this step is to produce from the current image estimate $\hat{x}$, a pool of patches that are less blurry. In accordance with the present invention, shrinking a blurry image y by a factor of $\alpha$, generates an $\alpha$-times smaller image $y^\alpha$, which contains approximately the same pool of patches as in (the larger) image y, only $\alpha$-times sharper.

It is known that most patches in a sharp natural image, recur multiple times in its scaled-down version; and that the source of this patch recurrence is the repetitions of small patterns at various sizes in the continuous scene. Consider a small pattern $f(\xi)$ in the continuous scene which recurs elsewhere as $f(\xi/\alpha)$, namely, a times larger (demonstrated by stars 851-852 in FIG. 8). Temporarily ignoring sampling issues, these two patterns are convolved with the blur of the camera $k(\xi)$, and appear in the observed image 802 as patches q and r there:

$$q(\xi) = k(\xi) * f(\xi), \quad r(\xi) = k(\xi) * f\left(\frac{\xi}{\alpha}\right) \qquad (21)$$

Upon shrinking the blurry image by a factor of α, the patch r becomes $$r^\alpha(\xi) = r(\alpha\xi) = \alpha \cdot k(\alpha\xi) * f(\xi) \qquad (22)$$

Accordingly, $r^\alpha(\xi)$ corresponds to the same continuous structure, $f(\xi)$, but convolved with the α-times narrower kernel $\alpha \cdot k(\alpha\xi)$, rather than with $k(\xi)$. This implies that the patch $r^\alpha$ in the smaller image is exactly an α-times sharper version of the patch q in the original blurry image, as demonstrated in image 803 of FIG. 8.

The above shows that shrinking an image by a factor of α produces a pool of patches of the same size that are α-times sharper. Step 2 of Algorithm (2) utilizes this pool of sharper patches as a non-parametric prior for the purpose of sharpening the blurry image by a factor of α. Thus, ignoring sampling issues, the first iteration of the algorithm recovers an image of the scene blurred with the narrower kernel $\alpha \cdot k(\alpha\xi)$. The second iteration further reduces the blur to $\alpha^2 \cdot k(\alpha^2\xi)$, and so on. The residual blur in the sequence of recovered images becomes narrower and narrower and eventually converges to:

$$\lim_{l\to\infty} \alpha^l \cdot k(\alpha^l \xi) = \delta(\xi) \qquad (23)$$

The discussion above ignored sampling issues and utilized continuous signals, whereas in practice the algorithm may operate on discrete images. Had the image in $\hat{x}l$ recovered in the l-th iteration corresponded to point-wise samples of $\alpha^l \cdot k(\alpha^l\xi)*f(\xi)$, the process would eventually tend to point-wise samples of the continuous $f(\xi)$, which would cause aliasing effects. Indeed, the Fourier transform of $\alpha^l \cdot k(\alpha^l \xi) * f(\xi)$, which is $K(\omega/\alpha^l)$, converges (for all ω) to:

$$\lim_{l\to\infty} K(\omega/\alpha^l) = K(0) = 1 \qquad (24)$$

Therefore, eventually, all frequencies would have been retained prior to sampling.

To avoid undesired aliasing effects, the method's goal is that the recovered in $\hat{x}l$ would correspond to samples of the continuous scene $f(\xi)$ filtered with the band-limited blur kernel $K(\omega/\alpha^l) \cdot \text{rect}(\omega)$, where $\text{rect}(\omega) = 1$ for $|\omega| < \pi$ (the Nyquist frequency) and is zero elsewhere. The method operates to shrink the blur in the spatial domain (expand it in the frequency domain), but not beyond the Nyquist frequency π (namely, zero all frequencies above π). Accordingly, as l tends to infinity, the function $K(\omega/\alpha^l) \cdot \text{rect}(\omega)$ tends to $K(0) \cdot \text{rect}(\omega) = \text{rect}(\omega)$. Therefore, in this case, $\hat{x}l$ converges to samples of the continuous scene convolved with the ideal low-pass filter sinc $(\xi)$.

In accordance with the present invention, the down-scaling operation performed on the blurry image $\hat{x}l$ should be done so that patches in the resulting down-scaled version $\hat{x}_l^\alpha$ are discrete versions of the continuous scene blurred with $K(\omega/\alpha^l) \cdot \text{rect}(\omega)$. The Applicants have further realized, based on calculations and derivations, that if the camera blur $K(\omega)$ is band-limited to π, so that the blurry image y does not suffer from aliasing, then down-sampling with a sinc kernel leads exactly to the desired result. Therefore, in Step 1 of Algorithm (2), the down-scaling is performed using a sinc kernel.

Referring now to step 2 of Algorithm (2), this step minimizes the objective function in optimization problem (19) with respect to $\hat{x}$ while holding $\hat{k}$ and $\hat{x}^\alpha$ fixed. Disregarding the last term in problem (19), which does not depend on $\hat{x}$, this step solves:

$$\operatorname*{argmin}_{\hat{x}} \|y - \hat{k} * \hat{x}\|^2 + \lambda_1 \rho(\hat{x}, \hat{x}^\alpha) \qquad (25)$$

This step is in effect a deblurring of image y by the kernel estimate so far, $\hat{k}$. It is noted that $\hat{k}$ may still be far from the correct k, so that the deblurred image $\hat{x}$ being constructed is not yet a sharp image. This is in contrast to conventional non-blind deblurring methods, which rely on priors for sharp natural images and seek to recover a sharp deconvolved image. In accordance with the present invention, the deconvolved image $\hat{x}$, which is still partially blurry, is obtained in Equation (25) by using patches from the smaller image and $\hat{x}^\alpha$ as a prior. These patches contain a residual blur that approximately corresponds to the current $\hat{k}$, and therefore serve as a good non-parametric prior for the current deblurring step.

In order to solve the "partial" deblurring problem (25), instead of using a natural image prior (e.g., learned from an external database of sharp patches), the present invention utilizes an image prior that is learned from the patches in $\hat{x}^\alpha$. Problem (25) may be written in vector form as:

$$\operatorname*{argmin}_{\hat{x}} \|y - \hat{K}\hat{x}\|^2 + \lambda_1 \rho(\hat{x}, \hat{x}^\alpha) \qquad (26)$$

In Equation (26), $\hat{K}$ is a matrix that corresponds to convolution with $\hat{k}$.

In accordance with the present invention, the formal definition of the function $\rho(\hat{x}, \hat{x}^\alpha)$ is minus the Expected Log Likelihood (EPLL) of patches in $\hat{x}$ namely:

$$\rho(\hat{x}, \hat{x}^\alpha) = -\Sigma_j \log p(Q_j \hat{x}) \qquad (27)$$

In Equation (27), Qj is a matrix that extracts the j-th patch from $\hat{x}$.

In accordance with the present invention, the probability $p(Q_j \hat{x})$ may be learned from the patches in $\hat{x}^\alpha$. Letting Ri denote the matrix which extracts the i-th patch from $\hat{x}^\alpha$, the probability $p(Q_j \hat{x})$ may be approximated using non-parametric density kernel estimation as:

$$p(Q_j \hat{x}) = c \sum_i \exp\left\{-\frac{1}{2h^2} \|Q_j \hat{x} - R_i \hat{x}^\alpha\|^2\right\} \qquad (28)$$

In Equation (28), h is a bandwidth parameter, and c is a constant independent of $\hat{x}$. This results in the prior term:

$$\rho(\hat{x}, \hat{x}^\alpha) = -\sum_j \log\left(\sum_i \exp\left\{-\frac{1}{2h^2} \|Q_j \hat{x} - R_i \hat{x}^\alpha\|^2\right\}\right) \qquad (29)$$

Having defined $\rho(\hat{x}, \hat{x}^\alpha)$, an algorithm may be derived for minimizing the objective of Equation (26). Applicants have realized that substituting Equation (29) into Equation (26) and setting the gradient to zero, leads to the requirement that:

$$(\hat{K}^T \hat{K} + \beta I)\hat{x} = \hat{K}^T y + \beta z \qquad (30)$$

In Equation (30), I is the identity matrix; $\beta = 0.5 M^2 \lambda_1 / h^2$, where M is the width of the patches (assuming square patches); and z is an image constructed by replacing each patch in $\hat{x}$ by a weighted average of its nearest neighbor (NN) patches in $\hat{x}^\alpha$.

More specifically, z is constructed by tiling patches $z_j$, while averaging overlaps:

$$z = \frac{1}{M^2} \sum_j Q_j^T z_j \qquad (30A)$$

Each patch $z_j$ corresponds to a weighted average of patches from $\hat{x}^\alpha$:

$$z_j = \sum_i w_{i,j} R_i \hat{x}^\alpha \qquad (30B)$$

The weights $w_{i,j}$ are computed according to the degree of similarity between patch j from x and patch i from $\hat{x}^\alpha$:

$$w_{i,j} = \frac{\exp\left\{\frac{1}{2h^2}\|Q_j\hat{x} - R_i\hat{x}^\alpha\|^2\right\}}{\sum_m \exp\left\{\frac{1}{2h^2}\|Q_j\hat{x} - R_m\hat{x}^\alpha\|^2\right\}} \qquad (30C)$$

Equation (30) cannot be solved in closed form since z depends non-linearly on $\hat{x}$. Instead, the method may alternate a few times between solving for while keeping z fixed, and computing z based on the newly found $\hat{x}$ using Equations (30A) and (30B).

In accordance with the present invention, in the first phase, the method replaces each patch in the current image $\hat{x}$ by a weighted average of its NNs (using $L_2$ distance) from the (sharper) image in $\hat{x}^\alpha$. This step actually enforces the prior of the present invention, which is that patches in the recovered image should be similar to patches in $\hat{x}^\alpha$. The resulting image z, however, does not necessarily conform to the data fidelity term, which requires that when the reconstruction is blurred with $\hat{k}$, it should be similar to the input image y. Thus, in the second phase, the method plugs z back into Equation (30) and updates $\hat{x}$. The method then repeats the NN search for the patches in the updated $\hat{x}$, generates an updated z, and so forth. Alternating these steps a few times, leads to an image $\hat{x}$ which satisfies both requirements; namely, the patches of $\hat{x}$ are similar to those in in $\hat{x}^\alpha$, and its blurry version $\hat{x}*\hat{k}$ resembles the input image y.

Referring now to step 3 in Algorithm (2), this step corresponds to updating the kernel $\hat{k}$, given the current estimate of the image $\hat{x}$. Disregarding the second term in Equation (19), which does not depend on $\hat{k}$, the optimization problem may be written in vector form as:

$$\underset{\hat{k}}{\operatorname{argmin}} \|y - \hat{X}\hat{k}\|^2 + \lambda_2\|\hat{k}\|^2 \qquad (31)$$

In Equation (31), $\hat{x}$ is a matrix that corresponds to convolution with the current image estimate $\hat{x}$. The solution to this least-squares problem is given by:

$$\hat{k} = (\hat{x}^T\hat{x} + \lambda_2 I)^{-1} \hat{x}^T y \qquad (32)$$

Constraints on the kernel may be incorporated into optimization problem (31), in which case Equation (32) no longer represents the optimal solution to problem (31). Possible constraints include the requirement that the coefficients of the kernel be positive and/or that they sum to 1. In the case that constraints are incorporated, problem (31) can be solved numerically with conventional optimization methods.

A demonstrative implementation may use 5×5 patches, and a scale gap of $\alpha=4/3$. To speed up the convergence of Algorithm (2), a coarse-to-fine manner may be used. For example, eight iterations of Algorithm (2) may be applied on each of the levels of an image pyramid constructed from the blurry input image y. The recovered $\hat{x}$ and $\hat{k}$ at each pyramid level may be interpolated to constitute an initial guess for the next pyramid level. The pyramid may be constructed with scale-gaps of $\alpha$ using down-scaling with a sinc.

Additional speed up may be obtained by implementing the NN search in the deblurring step more efficiently. Each patch in $\hat{x}$ needs to find its NN patches in $\hat{x}^\alpha$. In many cases (e.g., step edges and corners), the corresponding coarse-scale patch often resides just "beneath" the current patch, namely, at approximately the same relative image location in the scaled-down image; since step edges and corners are self-similar across scales (i.e., fractal-like). Accordingly, for fractal-like structures, $f(\xi)$ and $f(\xi/\alpha)$ (e.g., in image 801 of FIG. 8) reside at the same location in the continuous world, leading to a shaper patch $r^\alpha$ just below the blurry patch q. Most good NNs of a patch in a sharp image are typically found in a local neighborhood "beneath" the patch in a coarser pyramid scale; and this may significantly speed up the NN search in the context of single image super-resolution. The present invention may utilize the local search for NNs, to achieve computational speedup, as well as to guarantee more reliable NN matches, despite the different blurs across scales. In a demonstrative implementation, for each patch in $\hat{x}$, only a single NN is extracted, which may be found within a local 9×9 neighborhood beneath it in $\hat{x}^\alpha$ (using an $L_2$ distance). This approximation may suffice for recovering a good global kernel $\hat{k}$.

For computational efficiency, some implementations may solve all the large linear systems of equations in the Fourier domain. For example, the matrix $\hat{K}^T$ appearing in Equation (30) corresponds to convolution with a mirrored version of $\hat{k}$, which is equivalent to multiplication by $K*(\omega)$ in the frequency domain. Therefore, solving for $\hat{x}$ while keeping z fixed may be implemented as:

$$\hat{X}(\omega) = \frac{\hat{K}*(\omega)Y(\omega) + \beta Z(\omega)}{|\hat{K}(\omega)|^2 + \beta} \qquad (33)$$

This formulation may allow to significantly speed up computations, for example, using Fast Fourier Transforms (FFTs) with proper padding to avoid undesired border effects.

Similarly, Equation (32) may be computed in the Fourier domain as:

$$\hat{K}(\omega) = \frac{\hat{X}*(\omega)Y(\omega)}{|\hat{X}(\omega)|^2 + \lambda_2\sigma^2} \qquad (34)$$

Some embodiments of the present invention may implement Equation (34) using FFTs for speed purposes, but may take caution when doing so since multiplication of FFTs correspond to cyclic convolution rather than to linear convolution. The difference between the two is manifested at the borders of the image. Therefore, after computing $\hat{k}$ using an FFT implementation of Equation (34), the border regions of the input image y may be replaced with the border regions of $\hat{x}*\hat{k}$, and the process may be repeated again. Some embodiments may do this several times, until the border effect vanishes.

In some implementations, for example, the Fourier procedures in Equation (33) and (34) may be much faster (e.g., 50 times faster) than the corresponding steps in conventional blind and non-blind deblurring methods A demonstrative experiment tested Algorithm (2) on a large database comprising 640 large natural images of diverse scenes (typically 1,024 by 768 pixels), which were obtained by synthetically blurring 80 high-quality images with 8 blur kernels and adding 1 percent white Gaussian noise. Qualitative and quantitative comparisons to six conventional blind deblurring algorithms showed that the present invention yielded better results or superior results; for example, a smaller mean error ratio (defined in Equation (35) below), indicating better average performance, a smaller value of the highest error-ratio, indicating better worst-case performance, and increased success rate (i.e., percent of images with error ratio smaller than 5).

The Applicants' experiments indicated the usefulness of internal patch recurrence as a cue for kernel recovery. Complex textures with strong edges, such as an image region that depicts a sea with waves, may not be well represented by the generic image priors that are assumed by conventional methods. For example, such image regions may not conform to the assumption of sparsity of image gradients that some conventional methods utilize; and patches within such image region may not find good NNs in an external patch prior that is based on external database of images. In contrast, such image region of a sea with waves is self-similar, at least across small scale-gaps; and thus the present invention may produce more accurate kernel estimates, which lead to deblurred images with better visual quality and with lower error-ratios.

Some of the Applicants' experiments have utilized the following Error Ration measure, to measure the quality of a recovered blur kernel $\hat{k}$:

$$r = \frac{\|x - \hat{x}_{\hat{k}}\|^2}{\|x - \hat{x}_k\|^2} \quad (35)$$

In Equation (35), $\hat{x}_{\hat{k}}$ corresponds to (non-blind) deblurring with the recovered blur kernel $\hat{k}$; and $\hat{x}_k$ corresponds to deblurring with the ground-truth kernel k. The smaller r is, the better the reconstruction.

The Applicants' experiments further indicate that the deblurring method of the present invention is more robust than any conventional deblurring approach, as it rarely fails to recover the blur kernel with reasonable accuracy (low $r_{max}$). In the experiments, even the worst result over an entire database of images (namely, the recovered image with the highest error-ratio), looks reasonably acceptable in terms of visual quality; whereas conventional deblurring methods do not produce much better visual results than the present invention for that worst-result image. In contrast, the worst results of conventional deblurring methods are usually unacceptable in terms of visual quality; whereas the deblurring method of the present invention yields visually good results in most cases, and obtains much lower error ratios.

The present invention may be further utilized for "blind dereverberation", namely, removal of an unknown reverberation from an audio signal. A reverberant signal y may be modeled as related to a desired non-reverberant signal x through Equation (18), where k now represents the reverberation filter. In accordance with the present invention, in a non-reverberant audio recording x of e.g., speech and/or music, short segments recur "as is" at multiple time-stretched scales (obtained using e.g., a phase vocoder or other suitable time-stretching method). This cross-scale recurrence significantly diminishes in reverberant audio y. Segments from a time-stretched version $y^\alpha$ (corresponding to a faster speed) of a reverberant audio signal y, tend to be less reverberant than segments from y itself. Consequently, Algorithm (2) may be adjusted or adapted to allow recovering the reverberation filter k and the desired non-reverberant signal x from an input reverberant signal y. This may be done, for example, by modifying Step 1 to perform time-stretching to an $\alpha$-times faster speed using e.g., a phase vocoder (instead of down-sampling with a sinc kernel). Other suitable tasks may utilize the methods of the present invention.

Figure 9A:
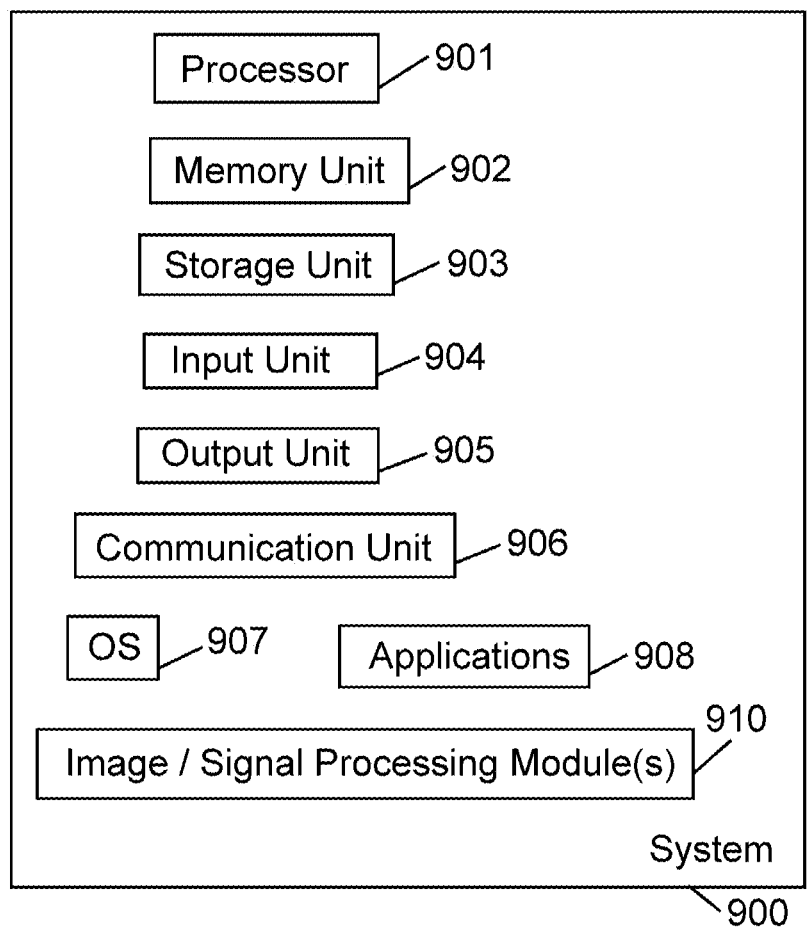
FIGS. 9A-9C are block-diagram illustrations of a demonstrative system and its components and modules, in accordance with the present invention.

Reference is made to FIG. 9A, which is a block-diagram illustration of a system 900 in accordance with some demonstrative embodiments of the present invention. System 900 may be implemented by using hardware components and/or software modules, and may be adapted to perform SR, deblurring, digital zoom, image enhancement, or other suitable tasks which may utilize the algorithms of the present invention.

System 900 may be implemented as, for example, a computer, a desktop computer, a laptop computer, a server, a "cloud"-based computing server or service, a Software as a Service (SaaS) system, a workstation, a tablet, a smartphone, a mobile electronic device, a mobile phone, a portable electronic device, a wearable electronic device, a portable gaming device, a gaming console, a digital camera, a video camera, an imager, a medical imaging device, an image editing apparatus, a photo editing apparatus, a medical imaging apparatus or system, an image processing apparatus, or other suitable device or system.

System 900 may comprise hardware components and/or software modules, which may be co-located or may be distributed across multiple locations or multiple devices. System 900 may utilize wired communication links, wireless communication links, cellular communication, Internet-based or IP-based communication, client/server architecture, peer-to-peer architecture, centralized architecture, distributed architecture, or other suitable architectures or protocols.

System 900 may comprise, for example, a processor 901 able to execute code or programs or instructions; a memory unit 902 (e.g., ROM, RAM, Flash memory, volatile memory, non-volatile memory); a storage unit 903 (e.g., hard disk drive, solid state drive, optical disk drive, CD drive, DVD drive); an input unit 904 (e.g., keyboard, mouse, stylus, trackball, joystick, microphone, scanner); an output unit 905 (e.g., screen, monitor, display unit, speakers, printer); a communication unit 906 (e.g., wireless or wired modem or transceiver, network interface adapter); an Operating System (OS) 907; one or more applications 908; and one or more image/signal processing module(s) 910. The components of system 100 may operate, or may be adapted or programmed or configured, to perform one or more of the operations, steps, algorithms and/or methods in accordance with the present invention.

Figure 9B:
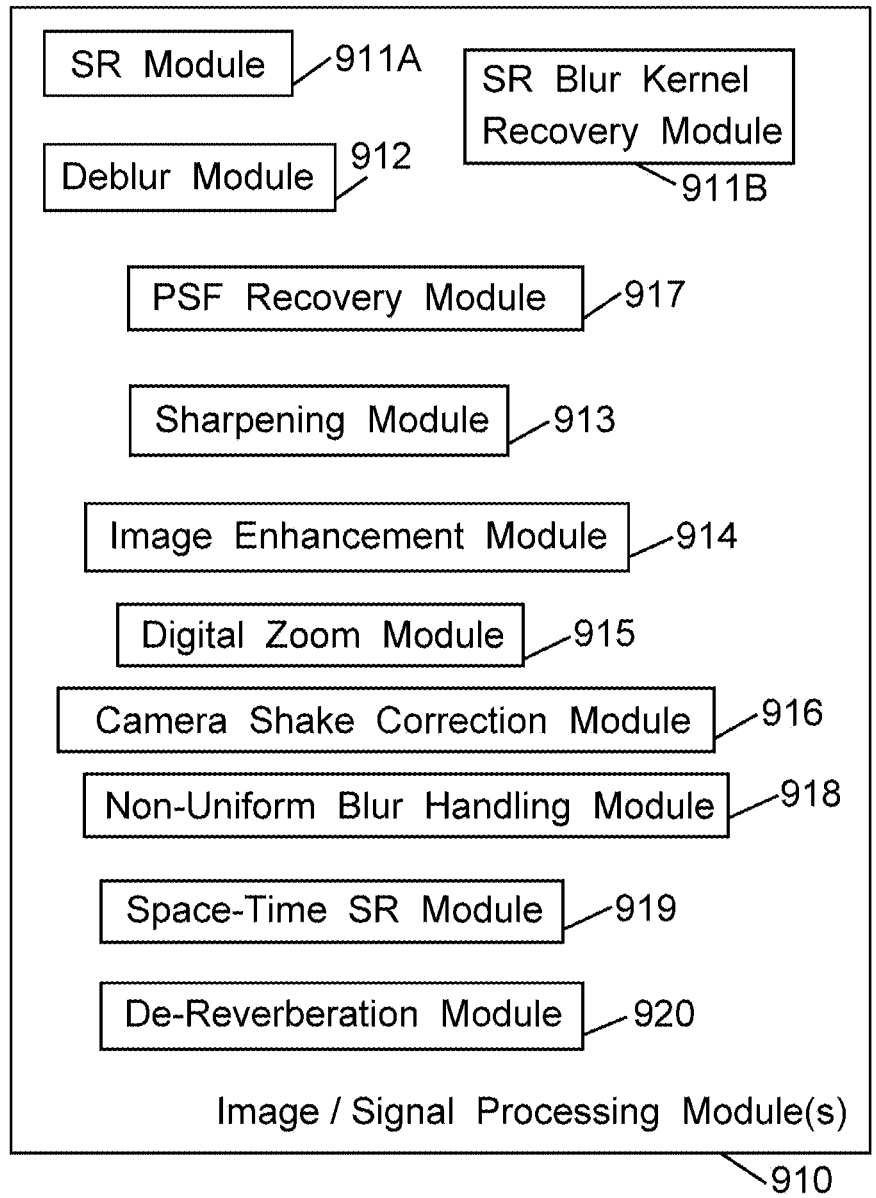

Reference is made to FIG. 9B, which is a block-diagram illustration of some demonstrative image/signal processing module(s) 910 which may operate in accordance with the algorithms of the present invention. One, or some, or all of the image/signal processing module(s) 910 may be included in particular implementations, systems and/or devices.

In a demonstrative implementation, image/signal processing module(s) 910 may comprise one or more of the following modules: a Super Resolution (SR) module 911A able to perform SR; an SR blur kernel recovery module 911B (which may optionally be a sub-module of SR module 911A, or may be a stand-alone or separate module) to recover the SR blur kernel; a deblur module 912 able to perform deblurring; a sharpening module 913, able to perform sharpening of an image or other signals (e.g., by performing deblurring and/or other suitable tasks); an image enhancement module 914 able to enhance or improve an image (e.g., by performing SR and/or deblurring and/or other suitable tasks); a digital zoom module 915 able to perform a "digital zoom" function which utilizes methods or algorithms in accordance with the present invention; a camera shake correction module 916 able to correct camera shake, by utilizing methods or algorithms in accordance with the present invention; a PSF recovery module 917 (which may optionally be a sub-module of deblur module 912, or may be a stand-alone or separate module) able to estimate or compute or recover a PSF value of an imager or camera or other image acquisition unit or other signal acquisition unit; a non-uniform blur handling module 918, which may be adapted to handle and/or enhance an image (or other signal) having non-uniform blur (e.g., by applying algorithms separately to multiple regions or areas or zones within the image or the signal); a space-time SR module 919 able to recover the temporal or spatio-temporal (three-dimensional) blur kernel for performing temporal or spatio-temporal SR (e.g., to increase temporal resolution of a video sequence); a de-reverberation module 920 or other reverberation removal module or reverberation reducer module, to reduce or remove reverberation from an audio signal; and/or other suitable modules, which may be implemented by using hardware components and/or software elements.

Figure 9C:
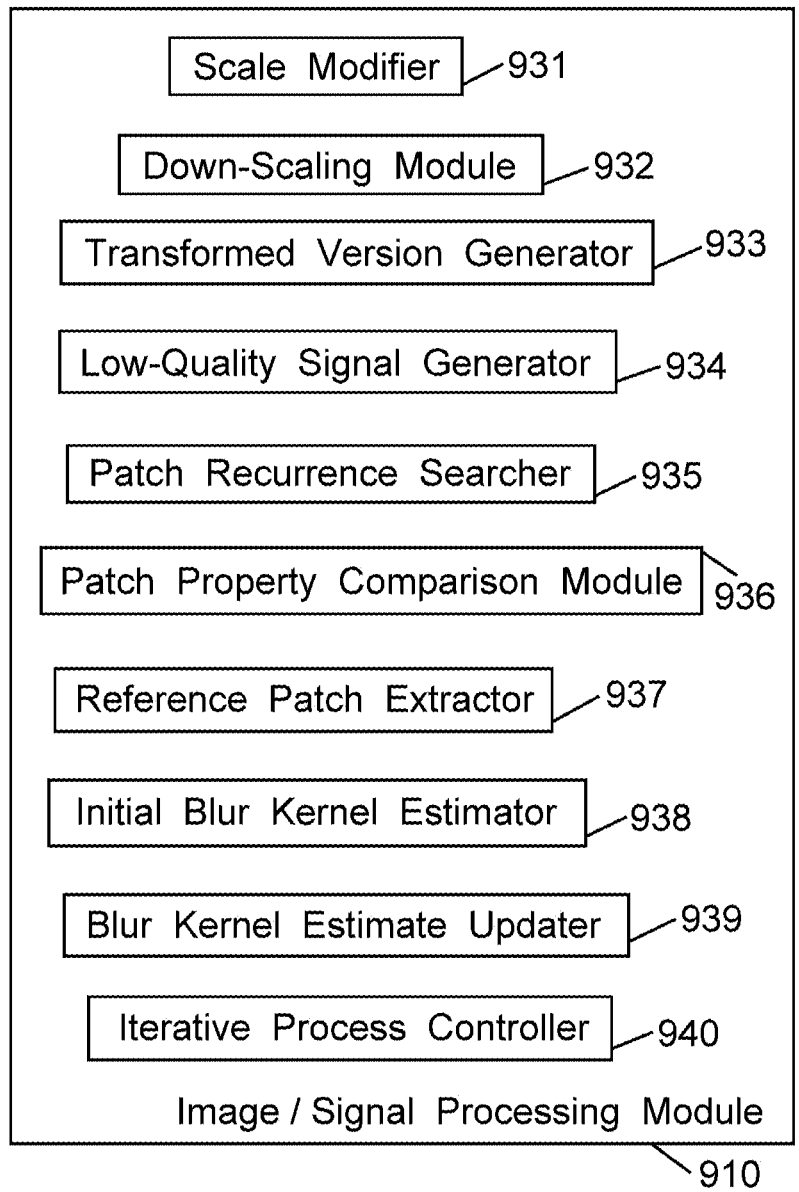

Reference is made to FIG. 9C, which is a block-diagram illustration of some demonstrative sub-units of an exemplary image/signal processing module 910 which may operate in accordance with the algorithms of the present invention. One, or some, or all of the sub-units of FIG. 9C may be included in particular implementations, systems and/or devices.

In a demonstrative implementation, image/signal processing module 910 may comprise, for example: a scale modifier 931 able to up-scale or down-scale or otherwise modify the scale of the input image or signal, optionally utilizing a down-scaling module 932, a transformed version generator 933, and/or low-quality signal generator 934; a patch recurrence searcher 935 able to search for patch recurrence, optionally utilizing a patch property comparison module 936 and/or a reference patch extractor 937 and/or other suitable components (e.g., a Nearest Neighbor searcher); as well as an initial blur kernel estimator 938 able to estimate or define the initial blur kernel, which may then be updated by a blur kernel estimate updater 939, optionally in an iterative process controlled or managed by an iterative process controller 940.

The components of FIG. 9C may operate to perform methods and/or algorithms in accordance with the present invention, in relation to an input image or other suitable input signal. For example, a method for performing a signal-processing task on an input signal, may comprise: estimating a blur kernel associated with said input signal, by utilizing recurrence of signal patches across multiple scales inside a reference signal which is a related version of said input signal.

In some embodiments, the reference signal may be at least one of: the input signal, a scaled-down version of said input signal, a lower-resolution version of said input signal, a deblurred version of said input signal, a sharper version of said input signal, a higher-quality version of said input signal, a filtered version of said input signal, a transformed version of said input signal.

In some embodiments, the input signal may be at least one of: an image, a photograph, a video sequence, an animation sequence, a multimedia clip, a medical signal, a Magnetic Resonance Imaging (MRI) signal, a functional MRI signal, an audio signal, a single-dimensional signal, a multi-dimensional signal.

In some embodiments, the signal patches may be at least one of: spatial patches, space-time patches, temporal patches, single-dimensional patches, multi-dimensional patches.

In some embodiments, the reference signal may be a transformed version of said input signal. The transformed version of the input signal may be obtained by one or more of the following transformations: scaling-down, scaling-up, replication, interpolation, rotation, shear, a homography, an affine transformation, a parametric transformation, a non-parametric transformation, a geometric transformation, a photometric transformation, a color transformation, an intensity transformation, a transformation to a descriptor space, a Fourier Transformation, a short-time Fourier Transform, a wavelet transform, a spectral transformation, time scaling using a phase vocoder, a transformation to another representation space.

In some embodiments, the method may estimate a blur kernel which may be at least one of: a Super-Resolution kernel, a spatial Super-Resolution kernel, a temporal Super-Resolution kernel, a space-time Super-Resolution kernel, a single-dimensional Super-Resolution kernel, a multi-dimensional Super-Resolution kernel, an optical blur, a camera Point Spread Function (PSF), a temporal exposure blur, a motion blur, a degradation kernel, a transform kernel, a convolution kernel, a uniform kernel, a non-uniform kernel, a sensor acquisition kernel, a reverberation kernel.

In some embodiments, system 900 may perform at least one of: signal up-sampling utilizing said blur kernel, signal interpolation utilizing said blur kernel, signal deblurring utilizing said blur kernel, super-resolution utilizing said blur kernel, digital zoom utilizing said blur kernel, signal enhancement utilizing said blur kernel, signal dereverberation utilizing said blur kernel, sensor characterization utilizing said blur kernel, sensor identification utilizing said blur kernel, signal compression utilizing said blur kernel, fractal encoding utilizing said blur kernel, increasing signal dynamic range utilizing said blur kernel.

In some embodiments, system 900 may perform a method comprising: (a) defining an initial estimate of said blur kernel; (b) generating from said reference signal an auxiliary low-quality signal by utilizing said initial estimate of said blur kernel; (c) for input patches in said input signal, finding similar patches in said auxiliary low-quality signal; (d) extracting reference patches in said reference signal which correspond to said similar patches in said auxiliary signal; (e) updating said estimate of said blur kernel to be an updated estimated blur kernel which best relates said reference patches to said input patches; (f) iteratively repeating steps (b) through (e) with said updated estimated blur kernel.

In some embodiments, the method may comprise: estimating a Super-Resolution version of said input signal by utilizing the final said updated estimated blur kernel, and wherein said reference signal is said input signal.

In some embodiments, the method may comprise: (a) defining an initial estimate of said blur kernel; (b) defining an initial estimate of said reference signal; (c) generating a down-scaled signal by down-scaling said estimate of said reference signal; (d) generating an updated estimate of said reference signal, wherein patches in said updated estimate of said reference signal are similar to patches in said down-scaled signal and also wherein convolving said updated estimate of said reference signal with said estimate of said blur kernel is similar to said input signal; (e) updating said estimate of said blur kernel to be the blur kernel which best relates said updated estimate of said reference signal and said input image; (f) iteratively repeating steps (c) through (e) with said updated estimate of said blur kernel and said updated estimate of said reference signal.

In some embodiments, generating said updated estimate of said reference signal may further comprise: (d1) composing an intermediate signal by replacing patches in current said estimate of said reference signal with a weighted average of their similar patches within said down-scaled signal, while averaging overlaps; (d2) updating said estimate of said reference signal to be a solution to a least-squares problem containing the following two quadratic terms: (i) a term which enforces that said updated estimate of said reference signal to be close to said intermediate signal, and (ii) a term which enforces that the convolution of said updated estimate of said reference signal with current said estimate of said blur-kernel be close to said input signal; (d3) iteratively repeating steps (d1) and (d2) with said updated estimate of said reference signal.

In some embodiments, the method may comprise: estimating a deblurred version of said input signal by utilizing the final said estimate of said blur kernel; wherein said initial estimate of said blur kernel is a delta function; and wherein said initial estimate of said reference signal is said input signal.

In some embodiments, the recurrence of signal patches may be detected by one or more of the following similarity measures: normalized correlation, Lp-norm, mutual information, Sum of Square Differences (SSD), and mean-square-error.

In some embodiments, the recurrence of signal patches may be determined by comparing one or more of the following patch properties: patch colors, patch intensities, patch frequency content, patch Laplacians, patch gradients, patch derivatives, filtered versions of the patch, high-pass filtered versions of the patch, low-pass filtered versions of the patch, band-pass filtered versions of the patch, patch descriptors, a function applied to the patch, features of the patch.

In some embodiments, the method may comprise: detecting recurrence of signal patches by an approximate Nearest Neighbor search.

In some embodiments, the recurrence of signal patches may be searched locally within a constrained portion of said reference signal.

In some embodiments, a method of performing Blind Super-Resolution of a low-resolution signal may comprise: utilizing patch recurrence across scales of said low-resolution signal to recover a super-resolution blur kernel; utilizing said super-resolution blur kernel for generating a high-resolution signal.

In some embodiments, a method of performing blind Super-Resolution of a low-resolution signal may comprise: performing the blind Super Resolution by utilizing recurrence of patches of said low-resolution signal in an external database of patches obtained from high-resolution signals.

In some embodiments, a method of performing Blind Deblurring of an input signal may comprise: estimating a blur kernel and a sharp version of said input signal, wherein said sharp version of said input signal is related to said input signal by said blur kernel, and wherein patch similarity is maximized across scales of said sharp version of said input signal.

In some embodiments, a method may comprise: estimating a blur kernel for a signal-processing task, by computing the blur kernel which maximizes patch similarity across scales of a deblurred version of an input signal obtained using said blur kernel.

In some embodiments, a device for performing a signal-processing task on an input signal may comprise: a blur kernel estimator to estimate a blur kernel associated with said input signal, by utilizing recurrence of signal patches across multiple scales inside a reference signal which is a related version of said input signal.

In some embodiments, the device may comprise: a Super Resolution module to perform Blind Super-Resolution of a low-resolution signal, by utilizing patch recurrence across scales of said low-resolution signal to recover a super-resolution blur kernel, and by utilizing said super-resolution blur kernel for generating a high-resolution signal.

In some embodiments, the device may comprise: a deblur module to perform Blind Deblurring of said input signal, by estimating a blur kernel and a sharp version of said input signal, wherein said sharp version of said input signal is related to said input signal by said blur kernel, and wherein patch similarity is maximized across scales of said sharp version of said input signal.

Some implementations of the present invention may be utilized in conjunction with, or may operate in conjunction with, one or more devices, systems and/or methods that are described in U.S. patent application Ser. No. 13/138,894, titled "Super Resolution from a Single Signal", published as United States patent application publication number 2012/0086850, which is hereby incorporated by reference in its entirety.

Some implementations of the present invention may be utilized in conjunction with, or may operate in conjunction with, one or more devices, systems and/or methods that are described in U.S. patent application Ser. No. 13/461,796, titled "Device, System, and Method of Image Processing Utilizing Non-Uniform Image Patch Recurrence", published as United States patent application publication number 2012/0281923, which is hereby incorporated by reference in its entirety.

The present invention may be implemented by utilizing a device comprising suitable hardware components and/or software modules. Such device may be or may comprise, for example, a computer, a computing device, a server, a workstation, a personal computer, a laptop computer, a tablet, a portable computing device, a web server, a server of a search engine website or service, a server of a social network website or social network service, or the like. Such device may comprise, for example, a processor, a central processing unit (CPU), a digital signal processor (DSP), an integrated circuit (IC), one or more processing cores or controllers, one or more buffers or accumulators or databases, a memory unit, a storage unit, an input unit (e.g., keyboard, mouse, touch-pad, touch-screen, microphone), an output unit (e.g., display unit, monitor, screen, audio speakers), a power source, a wireless transceiver, a wired transceiver, an operating system (OS), one or more applications, and/or other suitable hardware components and/or software modules.

The present invention may be implemented as a stand-alone or integrated application or module or service or software; as an image processing or photo processing software or module; as an image editing or photo editing software or module; as a filter or plug-in or extension or add-on to a software application or to a browser; as part of a "cloud computing" system, or as part of a Software as a Service (SaaS) implementation; or in other suitable products.

The present invention may be implemented to operate in conjunction with an imager, a sensor, an image sensor, a camera, a camcorder, a smartphone or mobile device or tablet having a camera, a gaming device or gaming console having a camera, a stand-alone camera or imaging device, a point-and-shoot camera, an SLR camera, or other suitable imaging devices or photo capturing devices or systems.

The present invention may optionally be implemented by using a software application which may reside on a storage medium or storage article. For example, a storage article may store machine-readable code or program or instructions, which may be executed by a machine or a processor or a computing device, in order to cause such machine or processor or computing device to perform one or more operations of the present invention. Optionally, the present invention may be implemented by a software application which may be downloaded (e.g., from an "application store" or "app store") or may be otherwise obtained (e.g., may be pre-installed by a supplier or provider of computing devices). Other suitable implementations may be used.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A computer implemented method for performing a signal-processing task of blind deblurring on an input signal, the method comprising:
   estimating a blur kernel associated with said input signal, by utilizing recurrence of signal patches across multiple scales inside a reference signal, wherein said reference signal is a related version of said input signal, and said blur kernel is a blur function relating said input signal and a sharper output version of said input signal having same scale; and
   utilizing said estimate of said blur kernel for deblurring said input signal;
   wherein said estimating comprises steps of:
   generating a down-scaled signal by down-scaling said reference signal;
   generating an estimate of said sharper output; and
   generating said estimate of said blur kernel;
   wherein patches in said estimate of said sharper output are similar to patches in said down-scaled signal;
   and wherein convolving said estimate of said sharper output with said estimate of said blur kernel is similar to said input signal.

2. The method of claim 1, wherein said reference signal is at least one of:
   said input signal,
   a scaled-down version of said input signal,
   a deblurred version of said input signal,
   a sharper version of said input signal,
   a higher-quality version of said input signal,
   a filtered version of said input signal,
   a transformed version of said input signal.

3. The method of claim 1, wherein said input signal is at least one of:
   an image, a photograph, a video sequence, an animation sequence, a multimedia clip, a medical signal, a Magnetic Resonance Imaging (MRI) signal, a functional MRI signal, an audio signal, a single-dimensional signal, a multi-dimensional signal.

4. The method of claim 1, wherein said signal patches are at least one of:
   spatial patches, space-time patches, temporal patches, single-dimensional patches, multi-dimensional patches.

5. The method of claim 1, wherein said reference signal is a transformed version of said input signal; wherein said transformed version of said input signal is obtained by one or more of the following transformations:
   scaling-down, scaling-up, replication, interpolation, rotation, shear, a homography, an affine transformation, a parametric transformation, a non-parametric transformation, a geometric transformation, a photometric transformation, a color transformation, an intensity transformation, a transformation to a descriptor space, a Fourier Transformation, a short-time Fourier Transform, a wavelet transform, a spectral transformation, time scaling using a phase vocoder, a transformation to another representation space.

6. The method of claim 1, wherein said blur kernel is at least one of:
   an optical blur,
   a camera Point Spread Function (PSF)
   a temporal exposure blur,
   a motion blur,
   a degradation kernel,
   a convolution kernel.
   a transform kernel,
   a uniform kernel,
   a non-uniform kernel,
   a sensor acquisition kernel,
   a reverberation kernel.

7. The method of claim 1, further comprising performing at least one of:
   signal deblurring utilizing said blur kernel,
   signal enhancement utilizing said blur kernel,
   signal dereverberation utilizing said blur kernel,
   sensor characterization utilizing said blur kernel,
   sensor identification utilizing said blur kernel.

8. The method of claim 1, wherein said method is implemented by a device selected from the group consisting of:
   a computer, a desktop computer, a laptop computer, a server, a cloud-based computing server, a cloud-based computing system, a Software as a Service (SaaS) system, a workstation, a tablet, a smartphone, a mobile electronic device, a cellular phone, a portable electronic device, a wearable electronic device, a gaming device, a gaming console, a digital camera, a video camera, an imager, a medical imaging device, an image editing apparatus, an image processing apparatus, a photo editing apparatus, a medical imaging apparatus, a medical imaging system.

9. The method of claim 1, wherein said generating said estimate of said blur kernel comprising iteration algorithm steps of:
(a) defining an initial estimate of said blur kernel;
(b) defining an initial estimate of said reference signal;
(c) generating a down-scaled signal by down-scaling said estimate of said reference signal;
(d) generating an updated estimate of said reference signal, wherein patches in said updated estimate of said reference signal are similar to patches in said down-scaled signal and also wherein convolving said updated estimate of said reference signal with said estimate of said blur kernel is similar to said input signal;
(e) updating said estimate of said blur kernel to be the blur kernel which best relates said updated estimate of said reference signal and said input signal;
(f) iteratively repeating steps (c) through (e) with said updated estimate of said blur kernel and said updated estimate of said reference signal.

10. The method of claim 9, wherein said generating said updated estimate of said reference signal further comprises iteration algorithm steps of:
(d1) composing an intermediate signal by replacing patches in current said estimate of said reference signal with a weighted average of their similar patches within said down-scaled signal, while averaging overlaps;
(d2) updating said estimate of said reference signal to be a solution to a least-squares problem containing the following two quadratic terms: (i) a term which enforces that said updated estimate of said reference signal to be close to said intermediate signal, and (ii) a term which enforces that the convolution of said updated estimate of said reference signal with current said estimate of said blur-kernel be close to said input signal;
(d3) iteratively repeating steps (d1) and (d2) with said updated estimate of said reference signal.

11. The method of claim 9, wherein said initial estimate of said blur kernel is a delta function; and wherein said initial estimate of said reference signal is said input signal.

12. The method of claim 1, wherein said recurrence of signal patches is detected by one or more of the following similarity measures: normalized correlation, Lp-norm, mutual information, Sum of Square Differences (SSD), and mean-square-error.

13. The method of claim 1, wherein said recurrence of signal patches is determined by comparing one or more of the following patch properties: patch colors, patch intensities, patch frequency content, patch Laplacians, patch gradients, patch derivatives, filtered versions of the patch, high-pass filtered versions of the patch, low-pass filtered versions of the patch, band-pass filtered versions of the patch, patch descriptors, a function applied to the patch, features of the patch.

14. The method of claim 1, further comprising: detecting recurrence of signal patches by an approximate Nearest Neighbor search.

15. The method of claim 1, wherein said recurrence of signal patches is searched locally within a constrained portion of said reference signal.

16. The method of claim 9, wherein said estimate of said sharper output is set to be at least one of:
the final said updated estimate of said reference signal; and
the output of any non-blind deblurring method by providing it the final said estimate of said blur kernel.

17. A device for performing a signal-processing task of blind deblurring on an input signal, the device comprising: at least one processor in communication with at least one memory unit, wherein said at least one processor is configured for:
estimation of a blur kernel associated with said input signal, by utilizing recurrence of signal patches across multiple scales inside a reference signal, said reference signal is a related version of said input signal, and said blur kernel is a blur function relating said input signal and a sharper output version of said input signal having same scale; and
utilization of said estimate of said blur kernel for deblurring said input signal:
wherein said estimation comprises:
generation a down-scaled signal by down-scaling said reference signal:
generation an estimate of said shaper output, and
generation said estimate of said blur kernel;
wherein patches in said estimate of said sharper output are similar to patches in said down-scaled signal;
and wherein convolving said estimate of said sharper output with said estimate of said blur kernel is similar to said input signal.

18. A computer implemented method for performing a signal-processing task on an input signal, the method comprising estimating a blur kernel for associating said input signal and a higher-resolution version of said input signal having a larger scale, by:
(a) defining an initial estimate of said blur kernel;
(b) generating from a reference signal an auxiliary low-quality signal by utilizing said estimate of said blur kernel;
(c) for input patches in said input signal, finding similar patches in said auxiliary low-quality signal;
(d) extracting reference patches in said reference signal which correspond to said similar patches in said auxiliary signal;
(e) updating said estimate of said blur kernel to he an updated estimated blur kernel which best relates said reference patches to said input patches;
(f) iteratively repeating steps (b) through (e) with said updated estimated blur kernel.

19. The method of claim 18, further comprising: estimating a Super-Resolution version of said input signal by utilizing the final said updated estimated blur kernel.

20. The method of claim 18, wherein said reference signal is at least one of: said input signal, a collection of one or more other signals, a transformed version of said input signal, and a filtered version of said input signal.

21. A device for performing a signal-processing task on an input signal, the device comprising: at least one processor in communication with at least one memory unit, wherein said at least one processor is configured to estimate a blur kernel for associating said input signal and a higher-resolution version of said input signal having a larger scale; said at least one processor is further configured to:
(a) define an initial estimate of said blur kernel;
(b) generate from said reference signal an auxiliary low-quality signal by utilizing said estimate of said blur kernel:

(c) for input patches in said input signal, find similar patches in said auxiliary low-quality signal;
(d) extract reference patches in said reference signal which correspond to said similar patches in said auxiliary signal;
(e) update said estimate of said blur kernel to he an updated estimated blur kernel which best relates said reference patches to said input patches;
(f) iteratively repeat steps (b) through (e) with said updated estimated blur kernel.

22. A computer implemented method for performing a signal-processing task on an input signal, the method comprising estimating a blur kernel associated with said input signal, by utilizing recurrence of signal patches across multiple scales inside a reference signal, wherein said reference signal is a related version of said input signal, and by:
(a) defining an initial estimate of said blur kernel;
(b) defining an initial estimate of said reference signal;
(c) generating a down-scaled signal by down-scaling said estimate of said reference signal;
(d) generating an updated estimate of said reference signal, wherein patches in said updated estimate of said reference signal are similar to patches in said down-scaled signal and also wherein convolving said updated estimate of said reference signal with said estimate of said blur kernel is similar to said input signal;
(e) updating said estimate of said blur kernel to be the blur kernel which best relates said updated estimate of said reference signal and said input signal;
(f) iteratively repeating steps (c) through (e) with said updated estimate of said blur kernel and said updated estimate of said reference signal.

23. The method of claim 22, wherein said generating said down-scaled estimate of said reference signal further comprises;
(d1) composing an intermediate signal by replacing patches in current said estimate of said reference signal with a weighted average of their similar patches within said down-scaled signal, while averaging overlaps;
(d2) updating said estimate of said reference signal to be a solution to a least-squares problem containing the following two quadratic terms; (i) a term which enforces that said updated estimate of said reference signal to be close to said intermediate signal, and (ii) a term which enforces that the convolution of said updated estimate of said reference signal with current said estimate of said blur-kernel be close to said input signal;
(d3) iteratively repeating steps (d1) and (d2) with said updated estimate of said reference signal.

24. The method of claim 22, wherein said initial estimate of said blur kernel is a delta function; and wherein said initial estimate of said reference signal is said input signal.

25. The method of claim 22, further comprising estimating a deblurred version of said input signal comprising at least one of:
setting said deblurred version of said input signal to he the final said updated estimate of said reference signal; and
setting said deblurred version of said input signal to be the output of any non-blind deblurring method by providing it the final said estimate of said blur kernel.

26. A device for performing a signal-processing task on an input signal, the device comprising: at least one processor in communication with at least one memory unit, wherein said at least one processor is configured to estimate a blur kernel associated with said input signal, by utilizing recurrence of signal patches across multiple scales inside a reference signal, wherein said reference signal is a related version of said input signal; said at least one processor is further configured to:
(a) define an initial estimate of said blur kernel;
(b) define an initial estimate of said reference signal;
(c) generate a down-scaled signal by down-scaling said estimate of said reference signal;
(d) generate an updated estimate of said reference signal, wherein patches in said updated estimate of said reference signal are similar to patches in said down-scaled signal and also wherein convolving said updated estimate of said reference signal with said estimate of said blur kernel is similar to said input signal;
(e) update said estimate of said blur kernel to be the blur kernel which best relates said updated estimate of said reference signal and said input signal;
(f) iteratively repeat steps (c) through (e) with said updated estimate of said blur kernel and said updated estimate of said reference signal.

* * * * *